(12) United States Patent
Moriwaki

(10) Patent No.: US 7,761,532 B2
(45) Date of Patent: Jul. 20, 2010

(54) PROCESSING METHOD FOR SENSING DATA

(75) Inventor: Norihiko Moriwaki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 11/208,641

(22) Filed: Aug. 23, 2005

(65) Prior Publication Data

US 2006/0173995 A1 Aug. 3, 2006

(30) Foreign Application Priority Data

Jan. 28, 2005 (JP) .............................. 2005-020549

(51) Int. Cl.
*G06F 15/16* (2006.01)
(52) U.S. Cl. ...................................... 709/217; 709/219
(58) Field of Classification Search ................. 709/223, 709/224, 217, 219; 455/521
See application file for complete search history.

(56) References Cited

U.S. PATENT DOCUMENTS

| | | | | |
|---|---|---|---|---|
| 5,598,566 | A * | 1/1997 | Pascucci et al. ............. 713/324 |
| 6,611,755 | B1 * | 8/2003 | Coffee et al. ................ 701/213 |
| 6,658,091 | B1 * | 12/2003 | Naidoo et al. ................ 379/37 |
| 6,892,131 | B2 * | 5/2005 | Coffee et al. ................ 701/200 |
| 7,261,690 | B2 * | 8/2007 | Teller et al. ................. 600/300 |
| 2003/0154056 | A1 * | 8/2003 | Ito et al. ..................... 702/188 |
| 2003/0212821 | A1 * | 11/2003 | Gillies et al. ................ 709/238 |
| 2004/0093239 | A1 * | 5/2004 | Ott et al. ........................ 705/2 |
| 2004/0103139 | A1 | 5/2004 | Hubbard et al. |
| 2005/0228889 | A1 * | 10/2005 | Cohen et al. ................ 709/227 |
| 2006/0022048 | A1 * | 2/2006 | Johnson .................... 235/462.1 |
| 2006/0122474 | A1 * | 6/2006 | Teller et al. ................. 600/300 |
| 2007/0050191 | A1 * | 3/2007 | Weider et al. ............... 704/275 |
| 2007/0132849 | A1 * | 6/2007 | Hill et al. .................... 348/159 |

FOREIGN PATENT DOCUMENTS

| | | |
|---|---|---|
| JP | 10-283239 | 4/1997 |
| JP | 11-65915 | 8/1997 |
| JP | 2001-318902 | 5/2000 |
| JP | 2002-6937 | 6/2000 |
| JP | 2003-319550 | 4/2002 |
| JP | 2004-280411 | 3/2003 |

OTHER PUBLICATIONS

Office Action from Japanese Patent Office sent on Feb. 9, 2010, with English translation.

* cited by examiner

*Primary Examiner*—Jeffrey Pwu
*Assistant Examiner*—Gerald Smarth
(74) *Attorney, Agent, or Firm*—Stites & Harbison PLLC; Juan Carlos A. Marquez, Esq.

(57) ABSTRACT

Detection of variations in a large quantity of sensing data connected to a network and prescribed processing corresponding to the variations are to be executed at high speed. An event-action controller for monitoring data collected from plural sensors and executing preset processing when the data has come to satisfy preset conditions includes an event-action entry search engine, an event-action table, a cache and a cache controller. The cache controller further includes a learning table for learning an arrival cycle of sensing data, a learning table controller, a cache access controller, a forwarding controller and time information.

5 Claims, 23 Drawing Sheets

PROCESSING METHOD FOR SENSING DATA

CLAIM OF PRIORITY

The present application claims priority from Japanese application P2005-20549 filed on Jan. 28, 2005, the content of which is hereby incorporated by reference into this application.

BACKGROUND OF THE INVENTION

This invention relates to a technology for utilizing information from a large number of sensors connected to a network.

DESCRIPTION OF THE RELATED ART

The main stream of the expanding use of networks including the Internet in recent years is made up of accessing accumulated contents including documents, pictures, images and aural data from a search engine or a preset link. Thus, the technology for accessing stored contents generated in the past is now complete.

On the other hand, streaming is known as one of the available technologies for transmitting currently generated information, by which a camera (Web camera) installed in a prescribed position consecutively distributes pictures. Also, a sensor network technology is being developed, by which sensing data obtained from a large number of small wireless sensor nodes are acquired through a network. Today, there are growing expectations for the sensor network which would capture information on the real world with sensors to let it be used in remote places via the network. While services currently available on the Internet are confined to services in a virtual space, the sensor network essentially differs from the existing Internet in its intended fusion with the real space. If fusion with the real space is realized, various services dependent on the situation in terms of time, position and so forth can be achieved. Network connection of diverse objects existing in the real space would provide traceability, which would make it possible to address the social needs for "safety" in a broader sense and the business needs for "higher efficiency" in inventory management and office work (see, e.g. JP 2002-006937 A, JP 2003-319550 A, JP 2004-280411 A, U.S. Published Patent Application No. 2004/0093239, U.S. Published Patent Application No. 2004/0103139).

In addition to that, there is also a method for preventing traffic increase in a network by providing a cache in which frequently accessed data are temporarily stored (see, e.g., JP 1999-65915 A).

SUMMARY OF THE INVENTION

However, all of the search engines disclosed in the above-cited examples of the related art, though capable of knowing the pointers (network addresses) of accumulated data on the network, are unsuitable for effectively retrieving real-time information out of the vast quantity of sensor data in the network or detecting variations in such information.

An object of this invention, therefore, is to realize a sensor network system capable of readily acquiring real-time information from a large number of sensors connected to a network, monitoring the vast quantity of information from the sensors connected to the network, and promptly identifying any variation in the information. More specifically, this invention is intended to achieve high speed processing of event-action control by which data is parsed to find out whether or not it meets preset conditions (event condition parsing) and processed according to the result of parsing. In particular, it is intended not to store frequently accessed data into a cache as in the conventional practice but to perform preemptive caching by utilizing intermittent actions of sensor nodes, namely cyclic data transmission.

According to this invention, an event-action controller for monitoring data collected from plural sensors and executing preset processing when the data has come to satisfy preset conditions includes an event-action entry search engine, an event-action table, a cache and a cache controller. The cache controller includes, in addition to a learning table for learning the arrival cycle of sensing data, a cache access controller and a forwarding controller.

This invention makes it possible to realize a sensor network system capable of high speed event-action processing, which should be performed for each individual set of sensing data, detection of variations in information and other necessary processing.

DESCRIPTION OF THE PREFERRED EMBODIMENTS

Embodiment 1

A preferred embodiment of this invention will be described below with reference to accompanying drawings.

Figure 2:
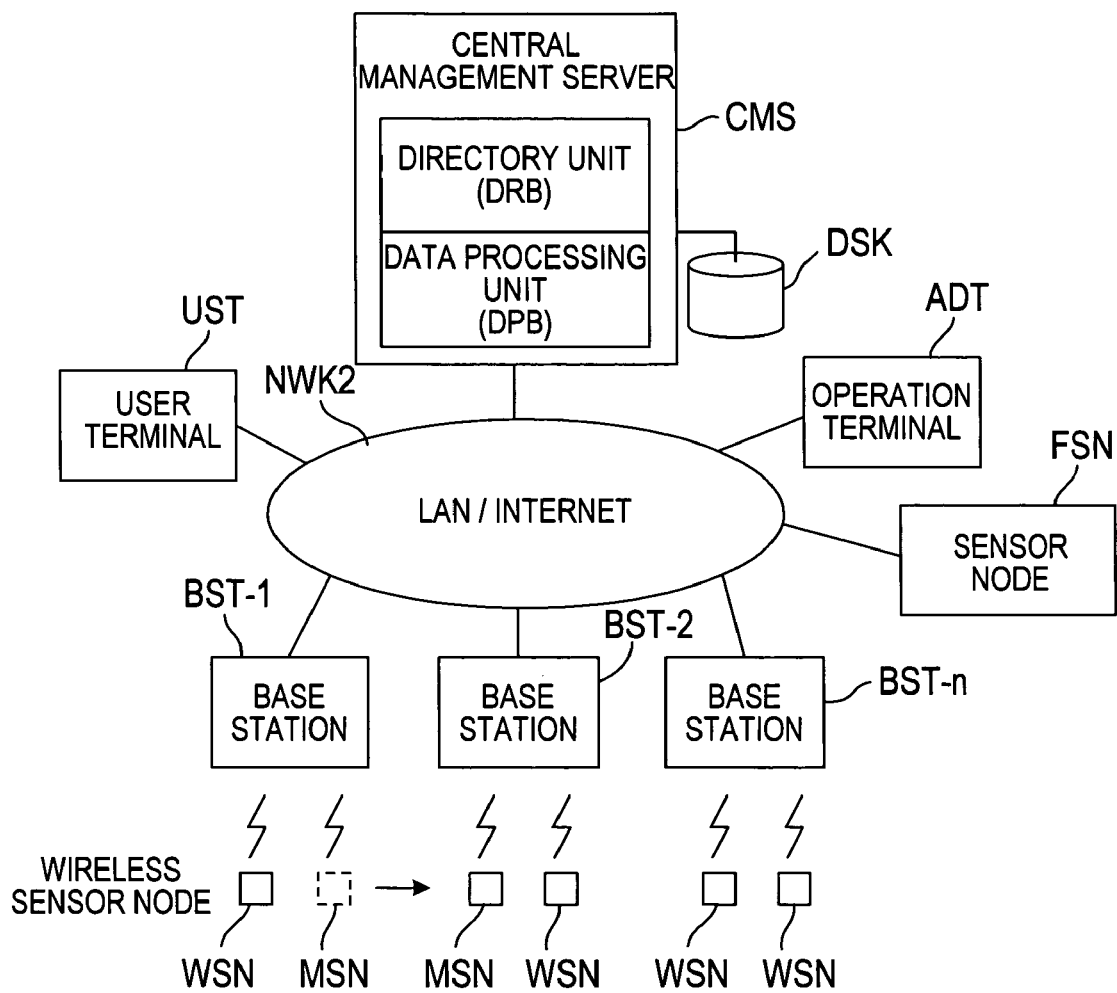
FIG. 2 is a system configuration diagram of a centralized data managing type sensor network.
Figure 3:
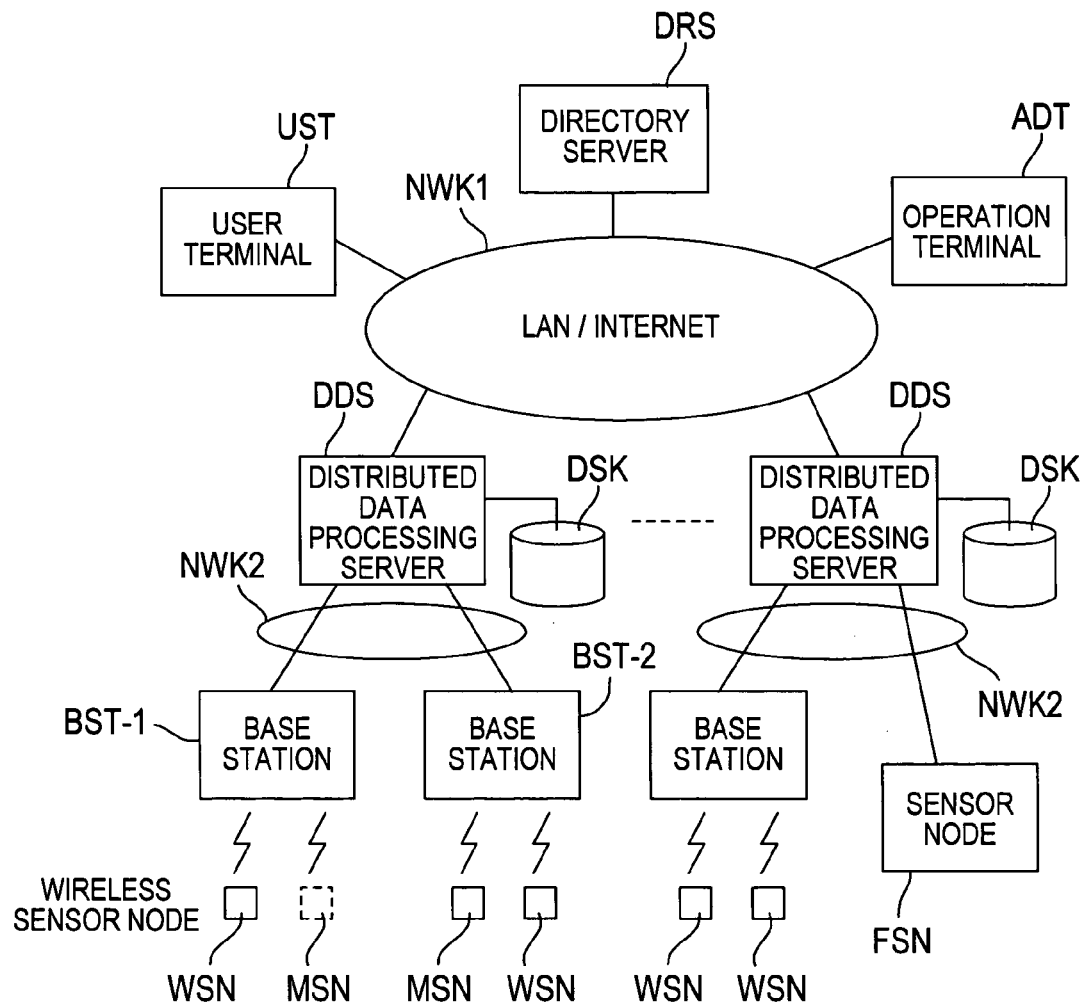
FIG. 3 is a system configuration diagram of a distributed data managing type sensor network.

FIG. 2 and FIG. 3 show examples of configuration of a sensor network system applicable to this invention.

<Summarized Configuration of the System>

First, the configuration of the system will be summarized. A sensor network system conceivably may process data on a sensor network in a centralized way (FIG. 2) or in a distributed way (FIG. 3). In this context, centralized data processing means that data acquired from sensors in a sensor node is managed by a central management server CMS and distributed data processing means that data acquired from sensors is managed by distributed data processing servers DDS.

Each of sensor nodes WSN (wireless sensor nodes) and MSN (wireless mobile sensor nodes) is a node which is installed in a prescribed position or fitted to a prescribed thing or person, collects information on its environment of the thing or person to which it is fitted, and transmits the information to base stations BST-1 through BST-n. The sensor nodes include the wireless sensor nodes WSN and MSN connected wirelessly to the base stations BST-1 through BST-n and a wired sensor node FSN connected by wire to a network NWK.

Sensors mounted on the wireless sensor nodes WSN, which are installed in a fixed way, for instance cyclically sense the situations around, and transmit the sensing information (or data) to a preset base station BST-1 through BST-n. Each wireless mobile sensor node MSN, supposed to be mobile as it is carried by a person or mounted on a vehicle, transmits its information to the nearest base station among BST-1 through BST-n. Incidentally, when the whole wireless sensor nodes are (generically) referred to, they are denoted by either WSN or MSN, and any individual wireless sensor node is denoted with an index character, such as WSN-1 through WSN-n or MSN-1 through MSN-n. This holds for other constituent elements, any of which is generically referred to without an index character, and any individual one of a type, with an index character, such as "-1 through -n". One or plural wireless sensor nodes WSN or MSN are connected to each of the base stations BST-1 through BST-n.

In centralized data processing, as shown in FIG. 2, each of the base stations BST-1 through BST-n collects data from each sensor node with the central management server CMS via a network NWK-2. In distributed data processing, as shown in FIG. 3, each of the base stations BST-1 through BST-n is connected to distributed data processing servers DDS-1 through DDS-n which collect data from sensor nodes via the network NWK-2. In this case, the number of distributed data processing servers DDS connected can be varied with the scale of the system.

The data processing unit DPB of the central management server CMS or each of the distributed data processing servers DDS-1 through DDS-n is provided with a disk drive DSK for storing data and the like detected by wireless and wired sensor nodes (hereinafter referred to as simply sensor nodes), a CPU and a memory (neither shown), executes a predetermined program, collects measured data from the sensor nodes as will be described below, stores and processes the data in accordance with prescribed conditions, and sends notices or forwards data to another server (which may as well be a directory server DRS in the case of distributed data processing). To a network NWK-1 (or NWK-2 if data undergo centralized processing), a user terminal UST for using sensing information and an operation terminal ADT for setting and managing sensor nodes are connected.

In this process, the data collected from the sensor nodes is mainly characteristic IDs for identifying the sensor nodes and sensed numerical data. It varies according to the time series, but it is not in a form readily understandable as it is by the user of the sensor node outputs (the user of the user terminal UST or the like). Therefore, the directory unit DRB of the central management server CMS (in the case of centralized data processing) or the directory server DRS (in the case of distributed data processing) holds the relationship of correspondence between the output data of sensor nodes and real-world models (persons, things, states and so on) understandable by the user. The user is thereby enabled to access in a form readily understandable to him or her the measured data stored in the data processing unit DPB (in the case of centralized data processing) or the disk drive DSK of any of the distributed data processing servers DDS-1 through DDS-n (in the case of distributed data processing).

Figure 4:
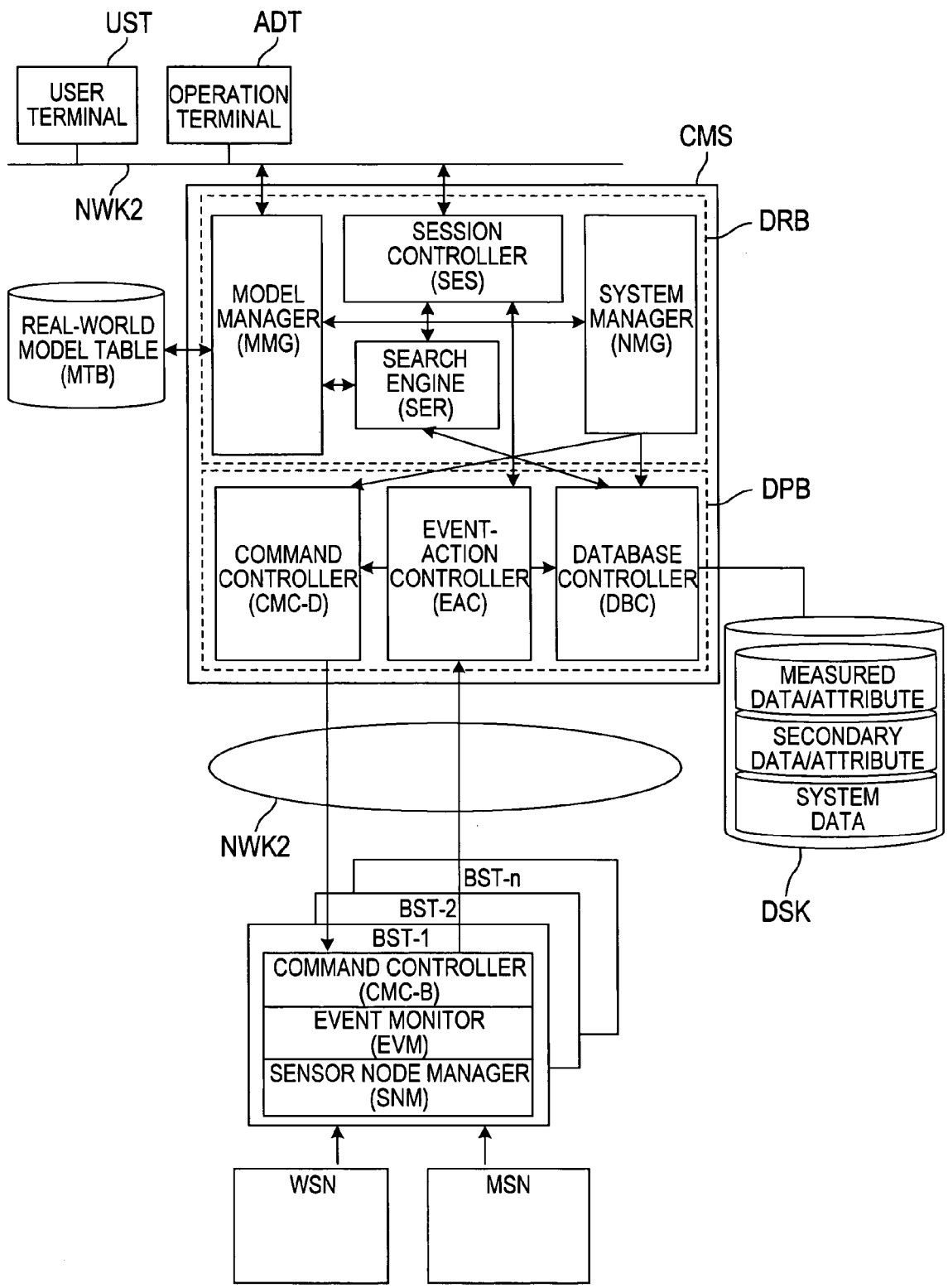
FIG. 4 is a block diagram of a centralized data managing type sensor network system.
Figure 5:
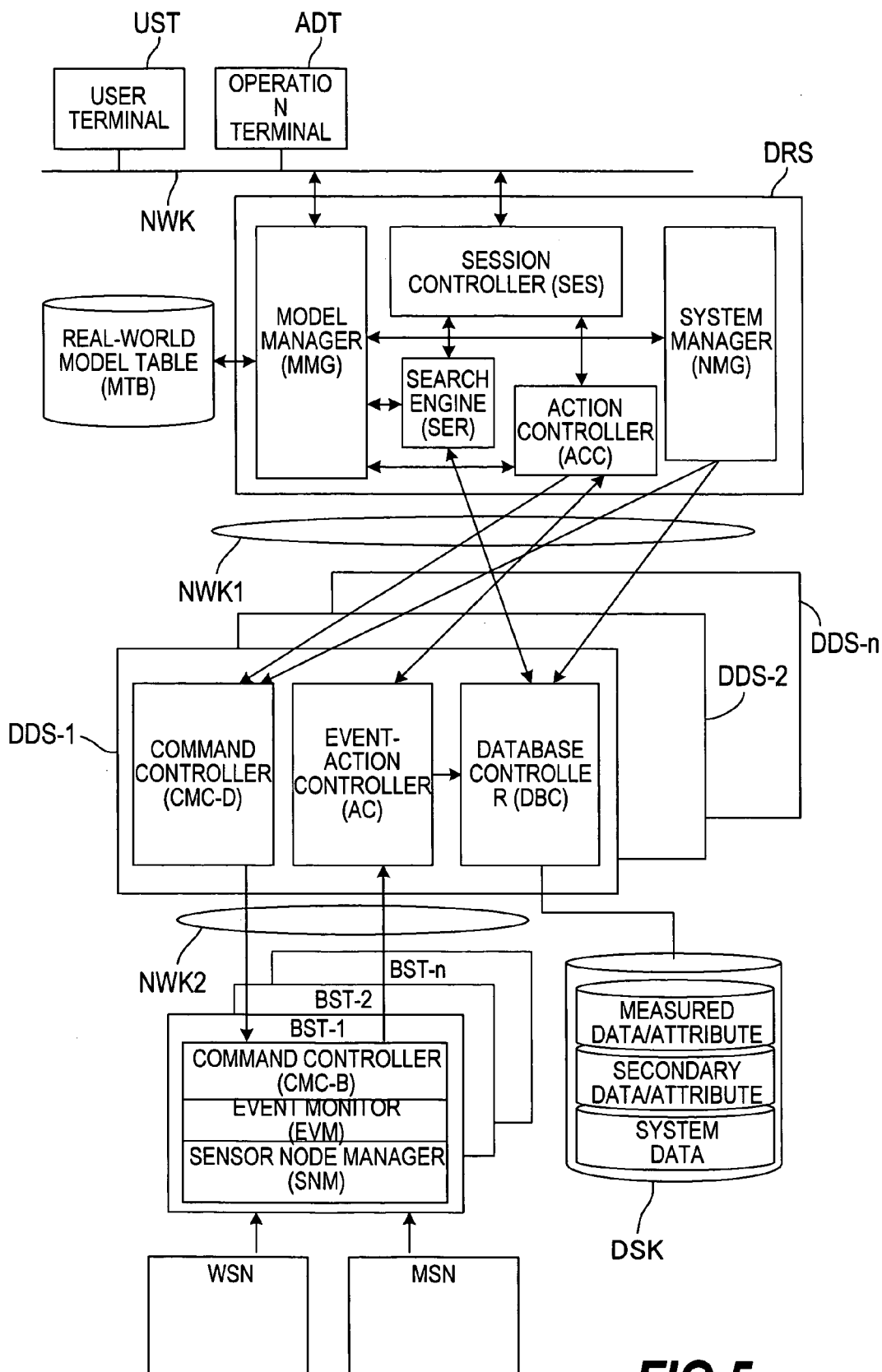
FIG. 5 is a block diagram of a distributed data managing type sensor network system.

FIG. 4 and FIG. 5 are functional block diagrams of the sensor networks of centralized data processing and distributed data processing shown in FIG. 2 and FIG. 3, respectively. Details of their constituent parts will be described in detail below.

<Base Stations BST>

The base station BST-1 which collects data from the wireless sensor nodes WSN and MSN and the wired sensor node FSN (hereinafter collectively referred to as sensor nodes) includes a command controller CMC-B, a sensor node manager SNM and an event monitor EVB. The command controller transmits and receives commands to and from a data processing unit DPB or a command controller in the distributed data processing server DDS-1, and transmits and receives commands on alterations in the setting of output timing and the like to and from sensor nodes. The sensor node manager SNM performs status management (regarding the operating state, remaining power and so forth) of the sensor nodes. The event monitor EVB detects any trouble or abnormal data in sensor nodes, and transmits the result of detection to the sensor node manager SNM. From each sensor node, measured data with a preset ID are transmitted to the base station BST.

<Data Processing Unit DPB, Distributed Data Processing Server DDS>

The data processing unit DPB or the distributed data processing server DDS-1 is provided with a disk drive DSK for storing a database DB, a command controller CMC-D, an event-action controller EAC and a database controller DBC, the latter three to be described afterwards.

The command controller CMC-D communicates with the base stations BST and the directory server DRS to be described afterwards, and transmits and receives commands and the like to and from them.

The event-action controller EAC, every time it receives from a base station BST measured data originating from a sensor node, acquires a data ID contained in the measured data, reads in the rules of event generation corresponding to the ID of the sensor node, and judges whether or not any event has arisen. Further, the event-action controller EAC executes an action in response to the event generation that corresponds to the data ID. Specific examples of its action include conversion of measured data into secondary data, storage of the measured data and the secondary data into the database DB through the database controller DBC, and giving notifications to other servers and the directory server DRS. Processing by the event-action controller EAC in the data processing unit DPB includes, in addition to the foregoing examples of processing, acceptance of event-action setting requests from the user terminal UST and the operation terminal ADT. Details of the event-action controller EAC will be described afterwards.

The disk drive DSK stores as the database DB measured data of the sensor nodes WSN, MSN and FSN received from the base stations BST, secondary data resulting from the processing of this measured data, and device data on the base stations BST, the wireless sensor nodes WSN and MSN and the wired sensor node FSN.

The database controller DBC stores the measured data, which are the output of the sensor nodes sent from the event-action controller EAC, into the database DB. If necessary, data resulting from numerical processing of the measured data or secondary data obtained from fusion with other sets of data is stored into the database DB. Incidentally, the device data are updated from time to time in response to requests from the operation terminal ADT and others.

<Directory Unit DRB, Directory Server DRS>

Each of the directory unit DRB and the directory server DRS includes a session controller SES for controlling communication from the user terminal UST or the operation terminal ADT connected via the network NWK-2 or NWK-1, a model manager MMG, a real-world model table MTB, a system manager NMG and a search engine SER. The directory server DRS further includes an action controller ACC.

The model manager MMG manages the relationships of correspondence between user-understandable real-world models (objects) and measured data collected by the distributed data processing servers DDS collected from sensor nodes or secondary data according to a real-world model list set in the real-world model table MTB. The directory unit DRB or the directory server DRS manages positional information on (links with URL or the like) of the locations of measured data or secondary data corresponding to real-world models. Thus, by designating a real-world model, the user can directly access measurement information on sensor nodes, which varies from moment to moment. Incidentally, real-world models are stored in the model table MTB.

The search engine SER references information in the real-world model table MTB in accordance with a request of search for an object accepted by the session controller SES, and executes searching of the DB controller DBC (in the data processing unit DPB or the distributed data processing servers DDS), in which the measured data is stored.

Incidentally, if the request of search is a query, matching of the database DB according to the content of the query and conversion of SQL (Structured Query Language) of the query are executed to accomplish the search. This query corresponds to a "latest data acquisition (snap shot/stream)".

Regarding the "latest data acquisition (stream)", an action to always forward desired data to the user terminal can be set in the event-action controller EAC.

The system manager NMG provides the operation terminal ADT or the like with an interface regarding the registration or search of the distributed data processing servers DDS (in the case of distributed data processing), the base stations BST and the sensor nodes, and manages the statuses of individual devices and of the sensor nodes. Management commands issued by the system manager NMG include, for instance, those for resetting, parameter setting, data erasure, data forwarding and standard event/action setting.

The action controller ACC in the directory server DRS communicates with the event-action controller EAC and the command controller CMC-D in the distributed data processing server DDS, and accepts requests for event-action setting from the user terminal UST and the operation terminal ADT. Then it analyzes the content of the accepted event or action, and sets the function sharing between the directory server DRS and the distributed data processing servers DDS-1 through DDS-n according to the result of analysis. Incidentally, one action or event may involve not just one distributed data processing server DDS but plural distributed data processing servers DDS-1 through DDS-n.

<One Example of Sensor Node>

Figure 6:
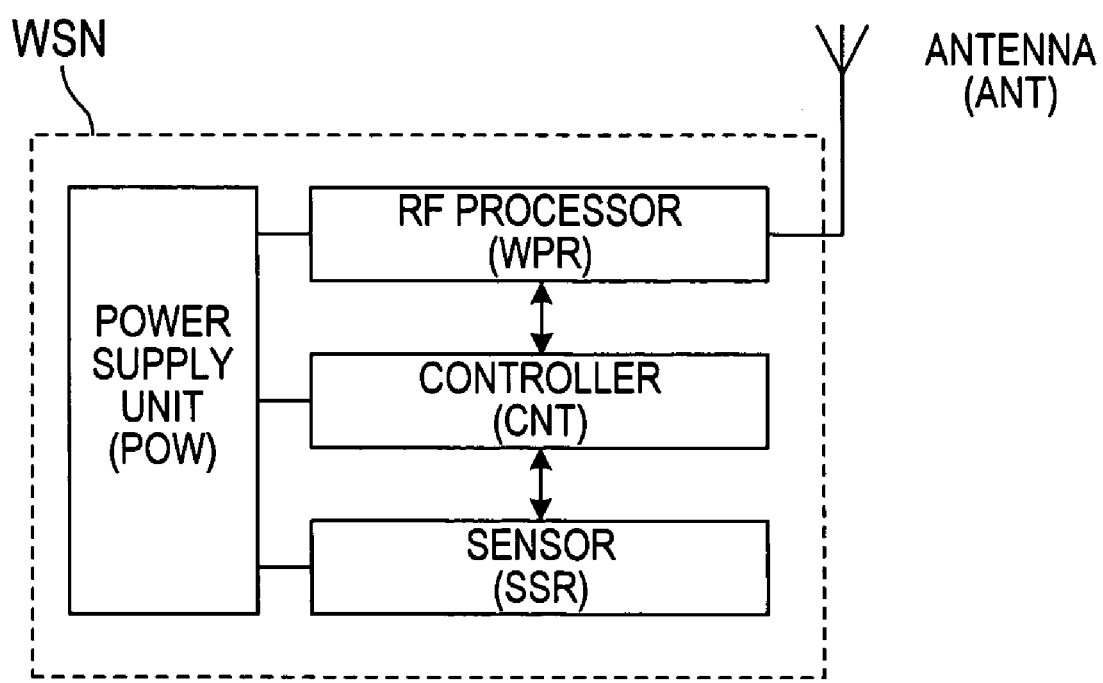
FIG. 6 is a block diagram of one example of wireless sensor node WSN.
Figure 7:
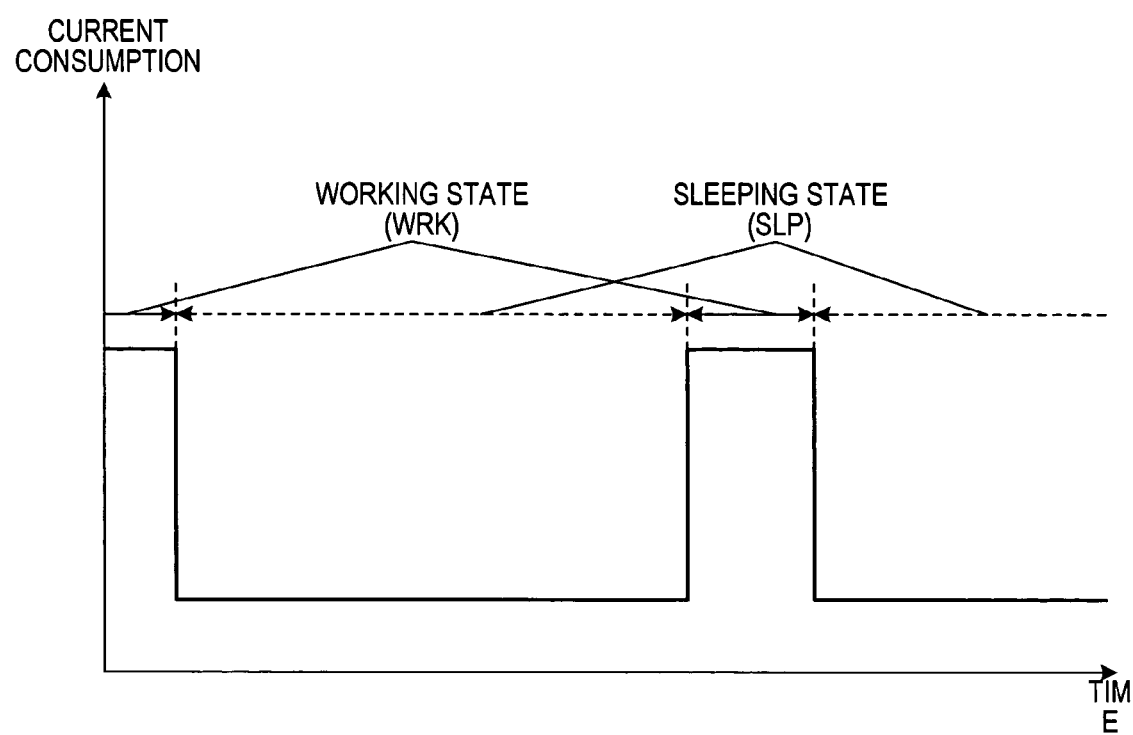
FIG. 7 is a graph of the operating state of the wireless sensor node, in which the relationship between time and current consumption is shown.

Next, one example of sensor node is shown in FIG. 6 and FIG. 7.

FIG. 6 is a block diagram showing one example of wireless sensor node WSN. The wireless sensor node WSN includes a sensor SSR for measuring the quantities of state of the object of measurement (including temperature, pressure and position) or variations in the quantity of state (including low/high temperature and low/high pressure), a controller CNT for controlling the sensor SSR, an RF processor WPR for communicating with the base stations BST, a power supply unit POW for supplying power to SSR, CNT and WPR, and an antenna ANT for RF transmission and reception.

The controller CNT reads in measured data of the sensor SSR either in preset cycles or irregularly, adds the preset ID of the sensor node to these measured data, and forwards them to the RF processor WPR. It may provide the measured data with information on the time at which sensing was done as a time stamp. The RF processor WPR transmits data sent from the controller CNT to the base stations BST.

Further, the RF processor WPR transmits to the controller CNT commands and the like received from the base stations BST, and the controller CNT analyzes the received commands and performs prescribed processing (e.g., alters the setting). Also, the controller CNT monitors the remaining power (or the charge) of the power supply unit POW and, when the remaining power falls beyond the threshold, transmits an alarm from the RF processor WPR to the base stations BST.

Since the RF processor WPR performs measurement for a long period with limited available power, it intermittently operates as shown in FIG. 7 to save power consumption. Referring to the diagram, the controller CNT stops driving the sensor SSR in the sleeping state SLP, switches over from the sleeping state to the working state at a prescribed timing, and starts driving the sensor SSR to transmit measured data.

Though FIG. 6 shows a case in which one wireless sensor node WSN is provided with one sensor SSR, plural sensors SSR may be installed as well. Or, a memory in which characteristic IDs are stored may be provided in place of the sensor SSR for the wireless sensor node WSN to be used as a tag.

Further, in the configuration illustrated in FIG. 6 and FIG. 7, the power supply unit POW may be either a conventional battery or an energy generation unit, such as a solar battery or a vibrational energy generation unit. The wireless mobile sensor nodes MSN may also be configured in the same way as illustrated in FIG. 6 and FIG. 7.

<Event-Action Processing>

Figure 8:
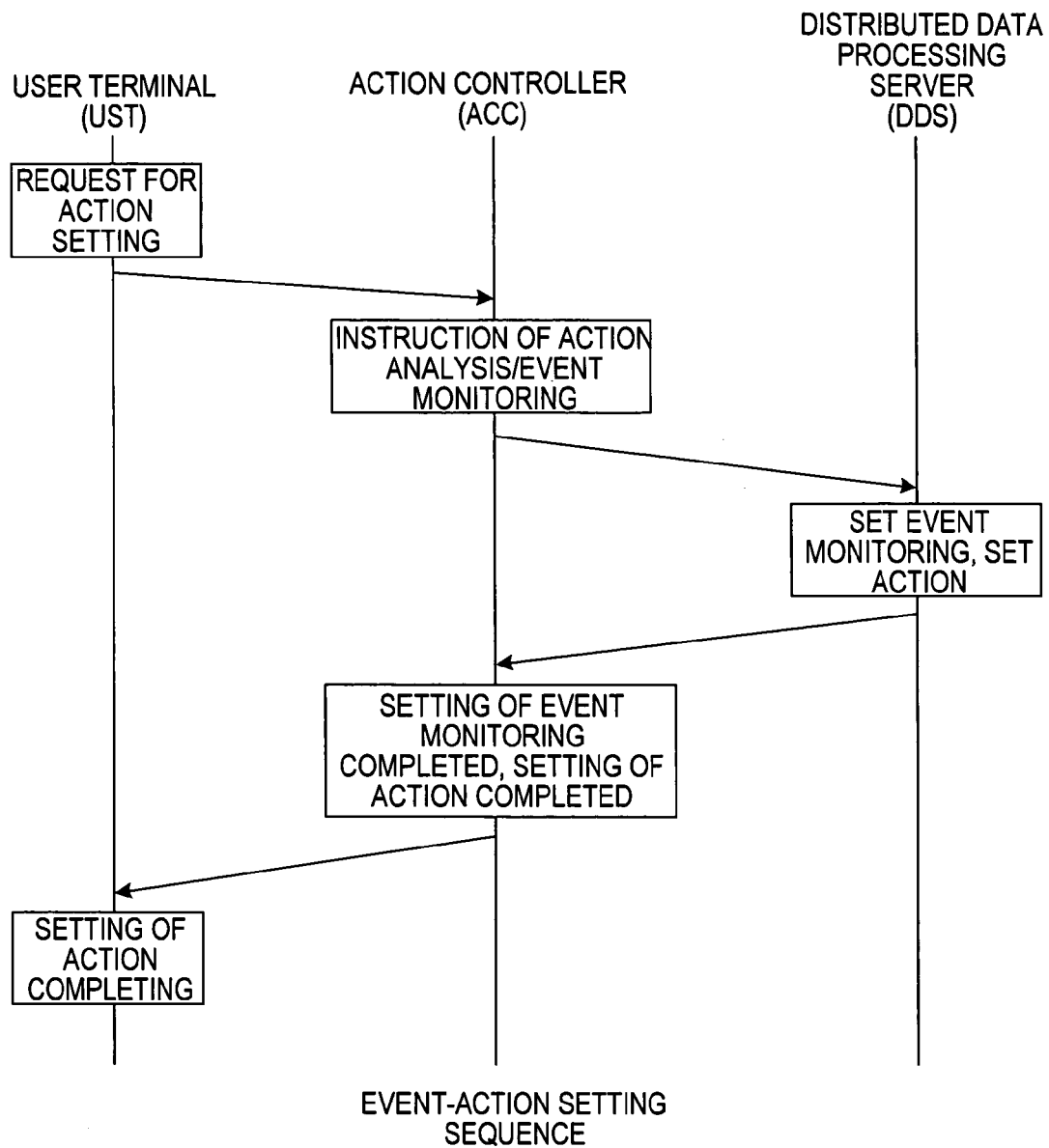
FIG. 8 is a sequence diagram of an example of event-action setting.

Next, event-action processing will be described with reference to FIGS. 8 through 11. FIG. 8 shows the sequence of event-action setting in distributed data processing. First, the user (or the service manager) accesses the action controller ACC of the directory server DRS from the user terminal UST or the like to request action setting. The action controller ACC searches for sensing information on the pertinent object, and sets the event conditions and action content in the event-action controller EAC of the distributed data processing server DDS managing the pertinent sensing information. More specifically, registration is made with an event-action table EATB in the event-action controller EAC so that a prescribed action is done when the data value corresponding to the pertinent data ID satisfies the prescribed event conditions.

Figure 9:
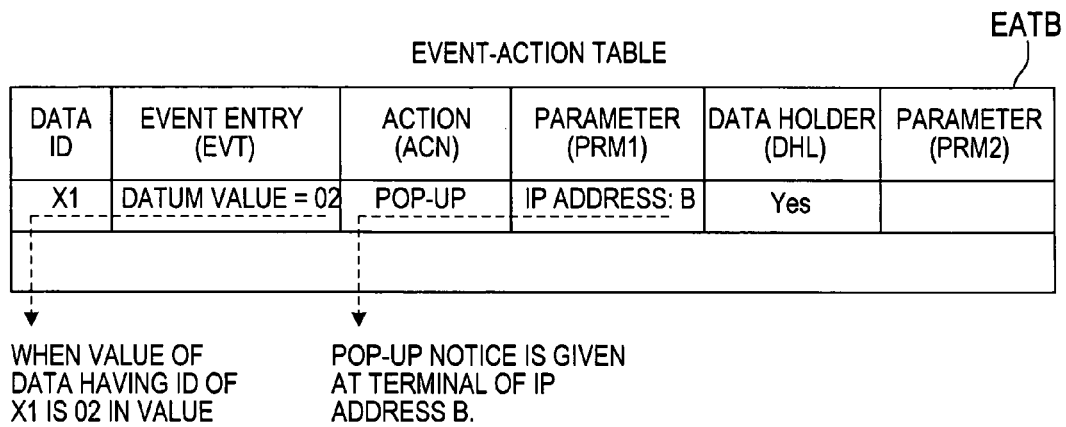
FIG. 9 shows the configuration of an event-action table.

In the event-action table EATB, as shown in FIG. 9, each event-action entry includes a data ID assigned to measured data, an event entry EVT which represents the condition of occurrence of an event regarding measured data, an action ACN which is taken when an event occurs, a parameter PRM1 necessary for the action, a data holder DHL indicating whether or not the measured data are to be stored into the database DB, and a parameter PRM2 related to the storage. In the example of event-action table EATB shown in FIG. 9, there is shown an event-action entry, when data of data ID=X1 has been received, if event entry condition EVT of data value=02 is satisfied, a pop-up notice will be given to the terminal of an IP address B indicated by the parameter PRM1. Also, the necessity of a data holder DHL for the same entry is registered in advance. For the data holder, too, the parameter PRM2 (e.g., the destination of data storage, the necessity of data compression and so on) may be registered in advance as required. After an event-action entry is registered in the event-action table EATB, the action controller ACC notifies the user terminal UST of the completion of action setting.

Figure 10:
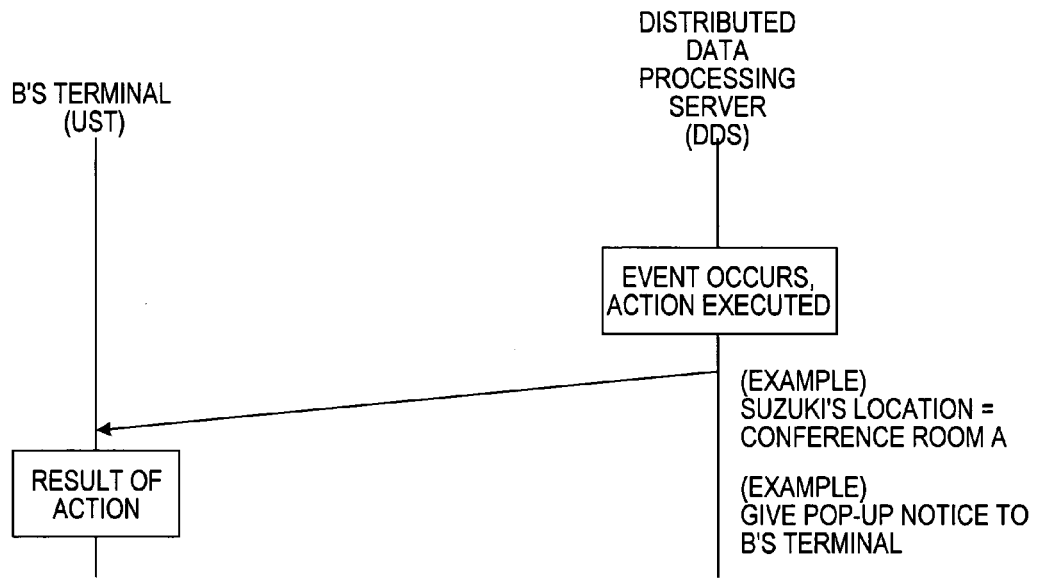
FIG. 10 is a sequence diagram of an example of response to event-action.

Next, the sequence of actions in response to the occurrence of an event will be described with reference to FIG. 10. The event-action controller EAC of the distributed data processing server DDS is monitoring in accordance with the event-action table EATB whether or not a preset event occurs at the time of the arrival of each set of data. When data of data ID=X1 has been received, if event entry condition EVT of data value=02 is satisfied, an action ACN in the event-action table EATB will be executed. In this case, the action to give a pop-up notice to the terminal of the IP address B is taken. Also, in accordance with a data holder instruction (the presence or absence of a data holder, an instruction of processing such as compression, designation of a storage directory and so forth) in the event-action entry of the pertinent data ID, data storage is processed at the time of data arrival.

In centralized data management, the processing performed by the action controller ACC and the distributed data processing server DDS is carried out by the event-action controller EAC in the data processing unit DPB.

As described above, when sensor network data is to be accumulated or variations in data are to be detected and notified, it is necessary to determine the occurrence of any event and to execute an action at every arrival of data. Especially where a vast amount of sensor nodes are to be accommodated, at least as many event-action entries as the sensor nodes should be defined in the event-action table EATB in advance. If the intervals of data arrivals are short, the pertinent entry should be acquired instantaneously out of the vast amount of event-actions at the time of data arrival. If the processing to acquire the event-action entry fails to catch up with the intervals of data arrivals, the determination of event occurrence and the execution of the action cannot be properly accomplished at every data arrival.

Figure 11:
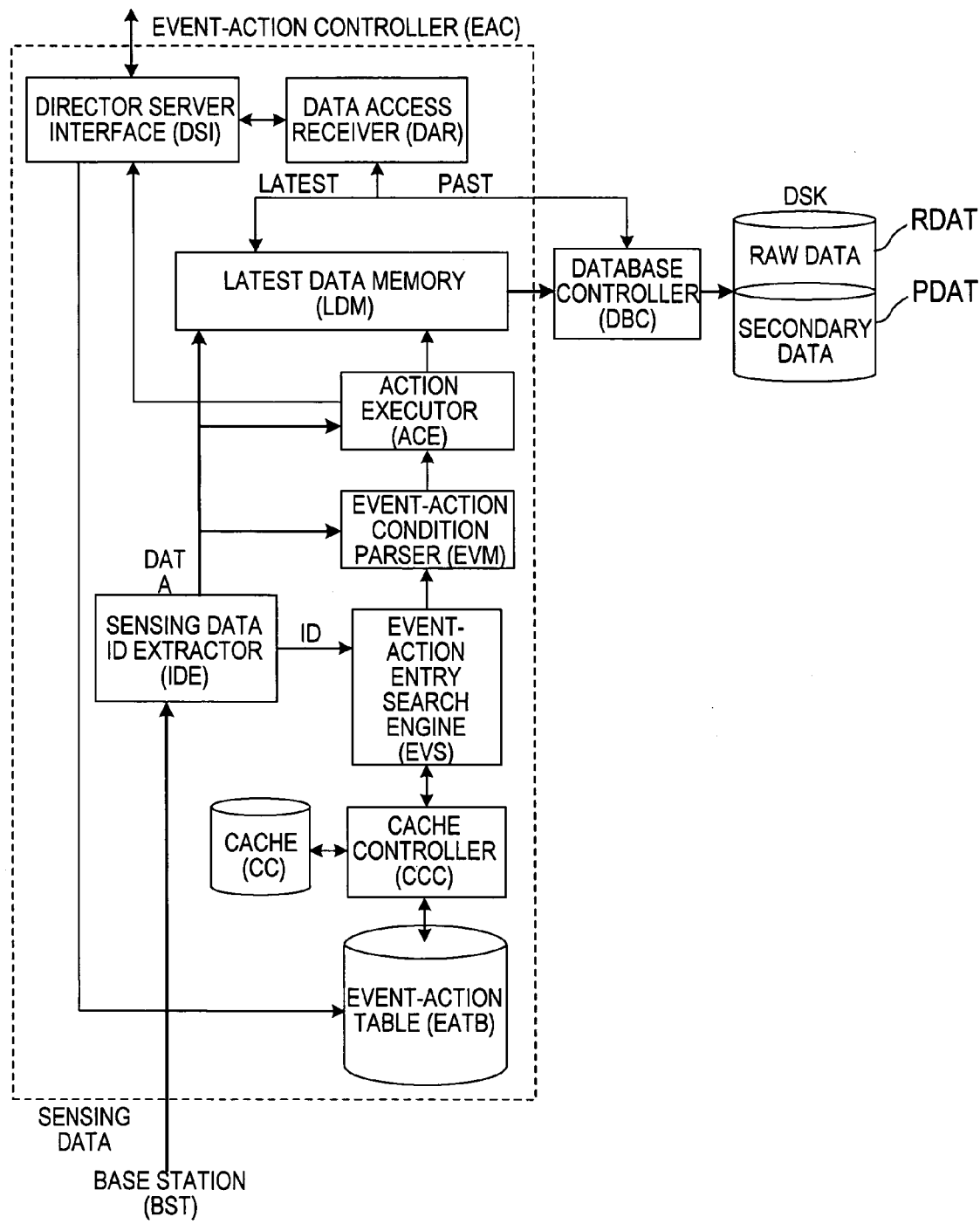
FIG. 11 is a functional block diagram of an event-action controller according to this invention.

Next, we show an example of processing that takes place in the event-action controller EAC with reference to FIG. 11.

In the event-action controller EAC, measured data received from a base station BST is first accepted by a sensing data ID extractor IDE, and a data ID, which is the ID assigned to the measured data, is extracted. At the same time, the sensing data ID extractor IDE sends the measured data to a latest data memory LDM.

The extracted data ID is sent to an event-action entry search engine EVS, where an event-action entry corresponding to the data ID is searched for. In a cache controller CCC, it is checked whether or not an event-action entry corresponding to the data ID from the event-action entry search engine EVS exists in a cache CC.

In the cache controller CCC, if the pertinent event-action entry exists in the cache CC (the cache is hit), the entry will be acquired and returned to the event-action entry search engine EVS. On the other hand, if the pertinent event-action entry is not in the cache CC, the event-action table EATB will be searched with the data ID as the key, and the pertinent event-action entry will be returned to the event-action entry search engine EVS. Since it is necessary to store event-action entries corresponding to all the data ID (m entries) in the event-action table EATB, it has to be configured of large-capacity storage means such as a hard disk or an external memory. By contrast, the cache CC is configured of a high speed memory or the like, and stores only a part of the event-action entries (n entries, where n is a far smaller number than m). Therefore, if the cache is hit in response to a request of search for an event-action entry, the event-action entry will be acquired at a very high speed. By contrast, if the cache is not hit, the disk will have to be accessed, and accordingly it will take a long time to acquire the desired entry.

The event-action entry search engine EVS sends the measured data and the acquired event-action entry to an event-action condition parser EVM, and the event-action condition parser EVM compares the value of the measured data with the event entry EVT. If the condition of event occurrence is satisfied, an action executor ACE will be notified to execute an action corresponding to the event occurrence, the pertinent action will be taken. Further, the event condition parser EVM conveys the request of the data holder DHL to the latest data memory. Regarding data for which the data holder DHL of the event-action table EATB is YES, the DB controller DBC receives data from the latest data memory LDM, and writes them into the disk drive DSK.

The event-action controller EAC, having received a request for referencing measured data from a directory server interface DSI, sends the access request to a data access receiver DAR. The data access receiver DAR, if the access request concerns the latest data, will read in measured data corresponding to the data ID contained in the access request from the latest data memory LDM and return it to the directory server interface DSI. Or if the access request concerns past data, it will read in measured data corresponding to the data ID contained in the access request from the disk drive DSK via the DB controller and return it to the directory server interface DSI.

Figure 1:
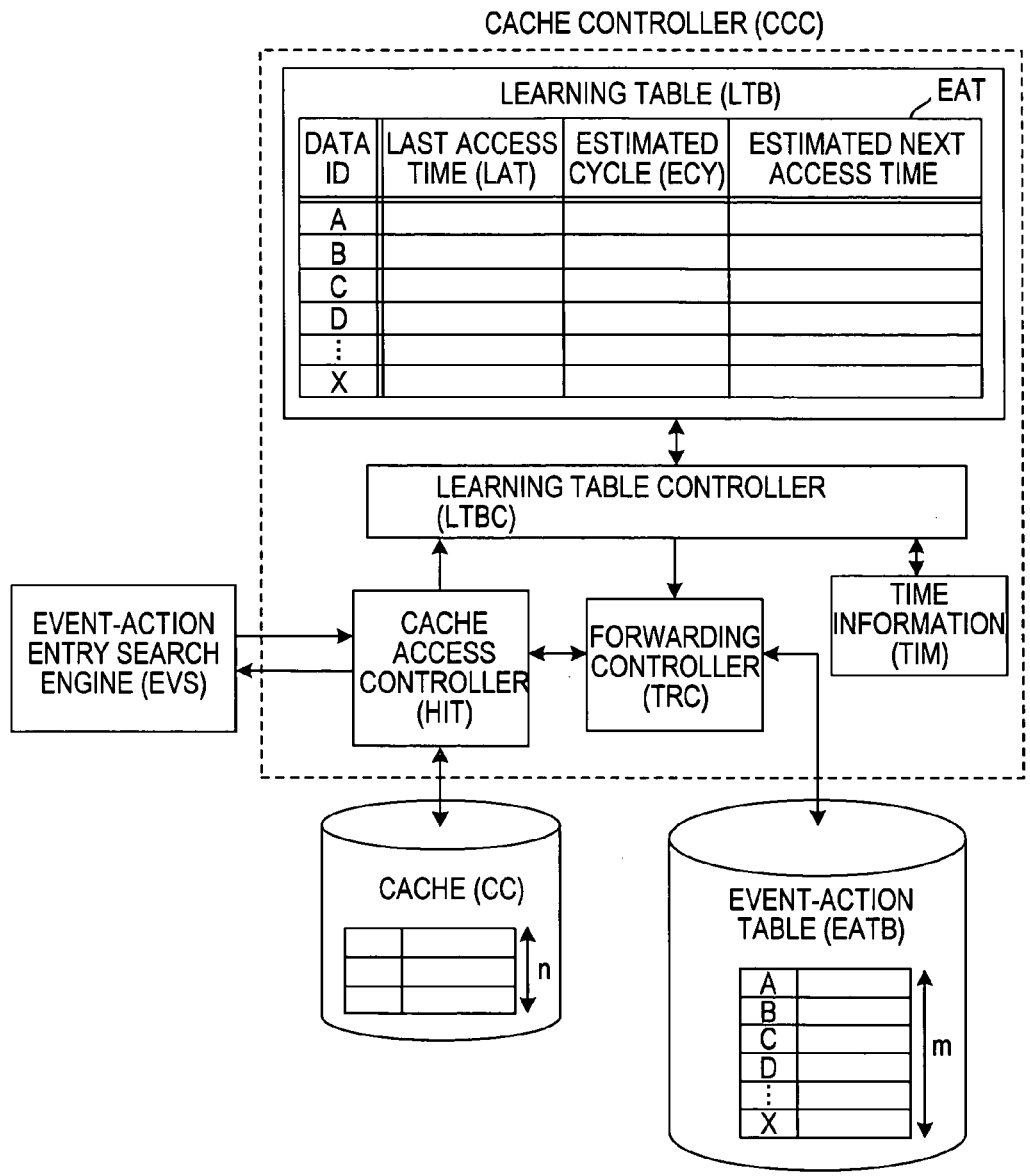
FIG. 1 is a functional block diagram of a cache control method, which is a first preferred embodiment of this invention.

Next, the configuration of the cache controller CCC will be described in detail with reference to FIG. 1. The cache controller CCC includes a cache access controller HIT, a learning table LTB, a learning table controller LTBC, a forwarding controller TRC and time information TIM.

Figure 12:
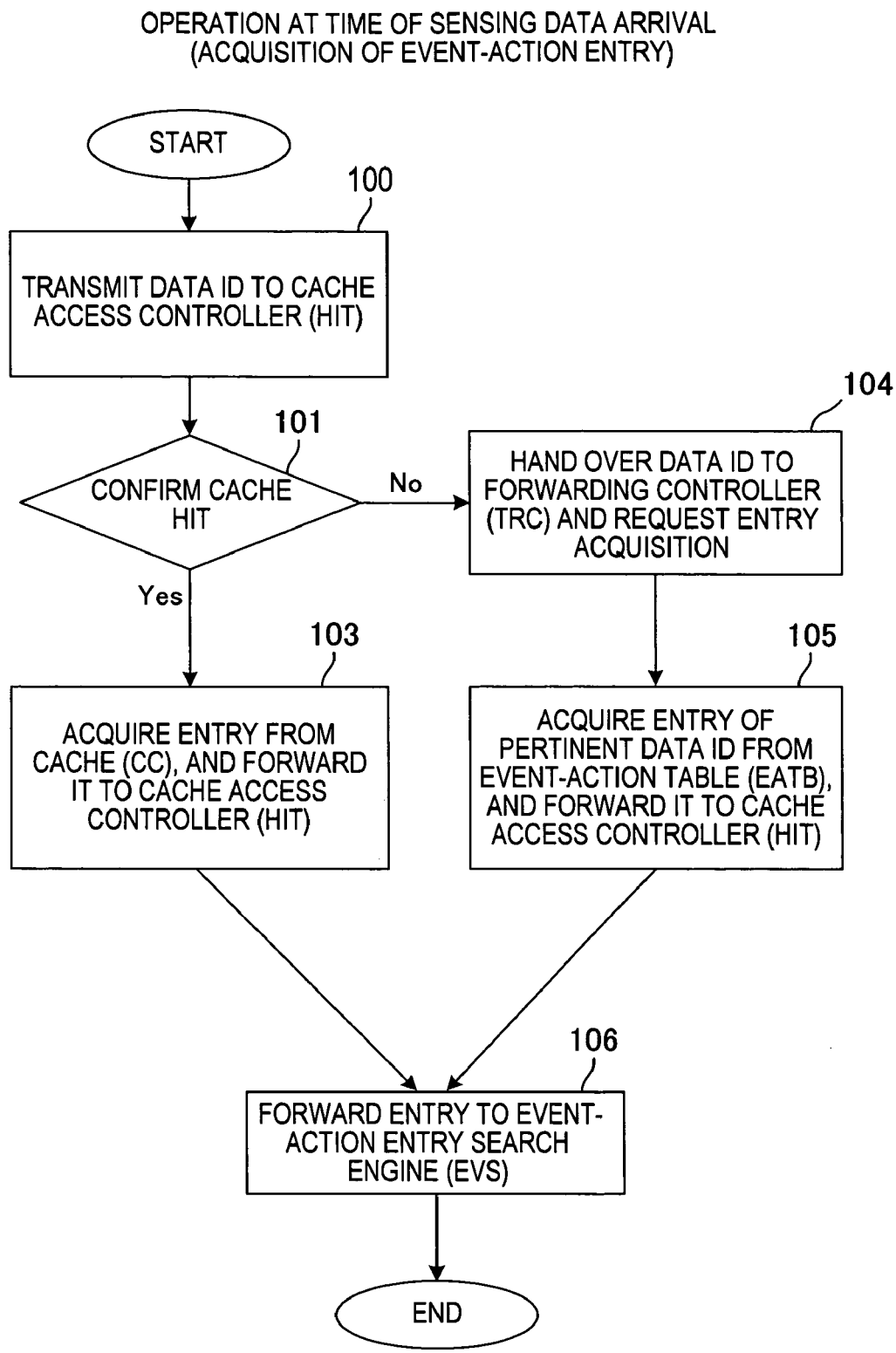
FIG. 12 is a sequence diagram concerning the acquisition of an event-action entry at the time of sensing data arrival.

Regarding this configuration, processing to acquire an event-action entry from a data ID at the time of sensing data arrival will be described first with reference to FIG. 12. Upon receiving a data ID from the event-action entry search engine EVS, the cache controller CCC transmits the data ID to the cache access controller HIT (step 100). The cache access controller HIT checks whether or not there is an event-action entry corresponding to the pertinent data ID in the cache CC (whether the cache is hit or not) (step 101). If the cache is hit, the entry will be acquired from the cache CC and forwarded to the cache access controller HIT (step 103). Or if the cache fails to be hit, the data ID will be handed over to the forwarding controller TRC and the acquisition of the entry will be requested (step 104). Next, the entry corresponding to the pertinent data ID is acquired from the event-action table EATB and forwarded to the cache access controller HIT (step 105). Finally, the entry acquisition is achieved by forwarding the entry from the cache access controller HIT to the event-action search engine EVS (step 106).

Figure 13:
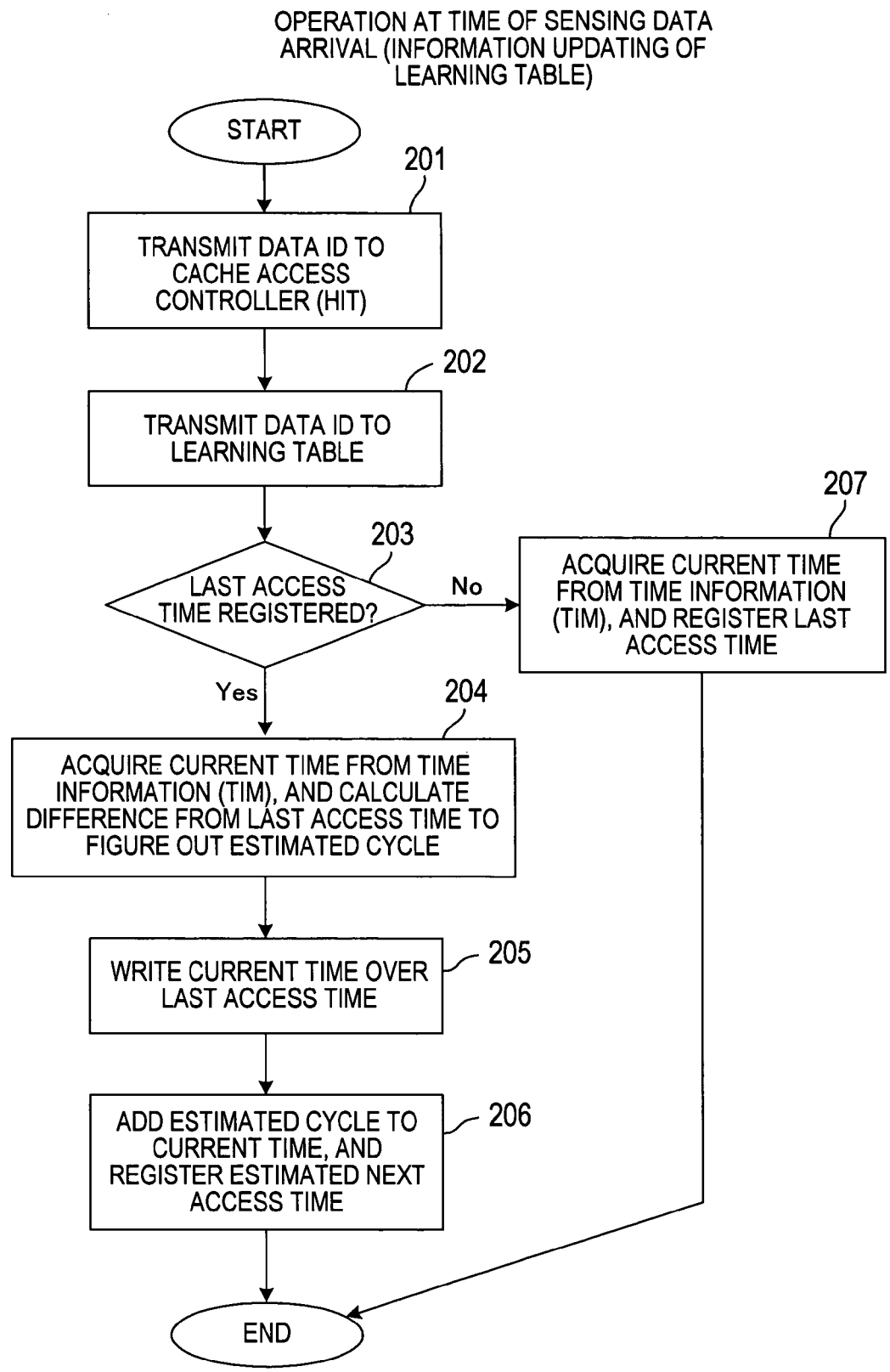
FIG. 13 is a sequence diagram concerning the information updating of a learning table at the time of sensing data arrival.
Figure 14:
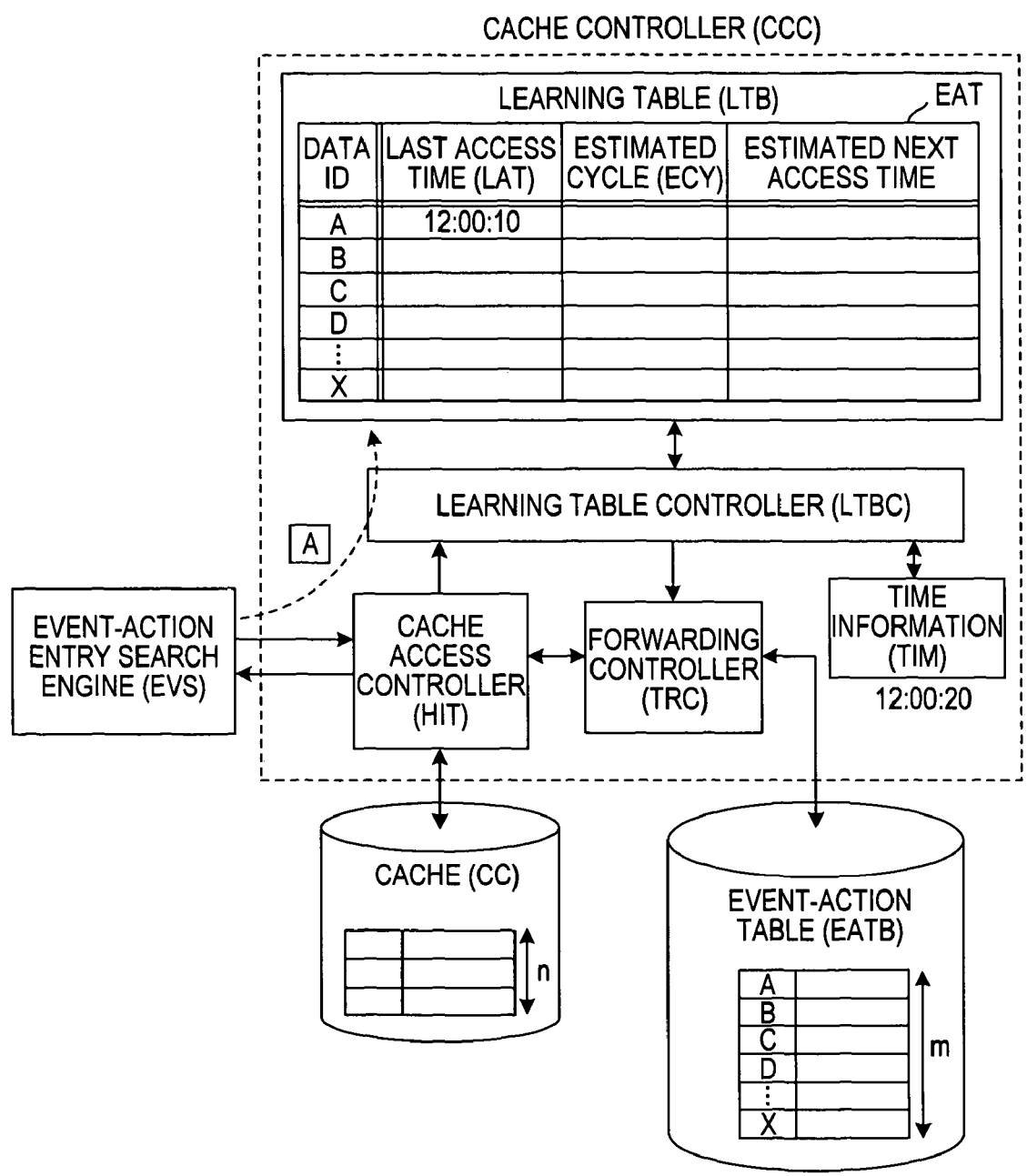
FIG. 14 illustrates the updating of the learning table at the time of sensing data arrival.
Figure 15:
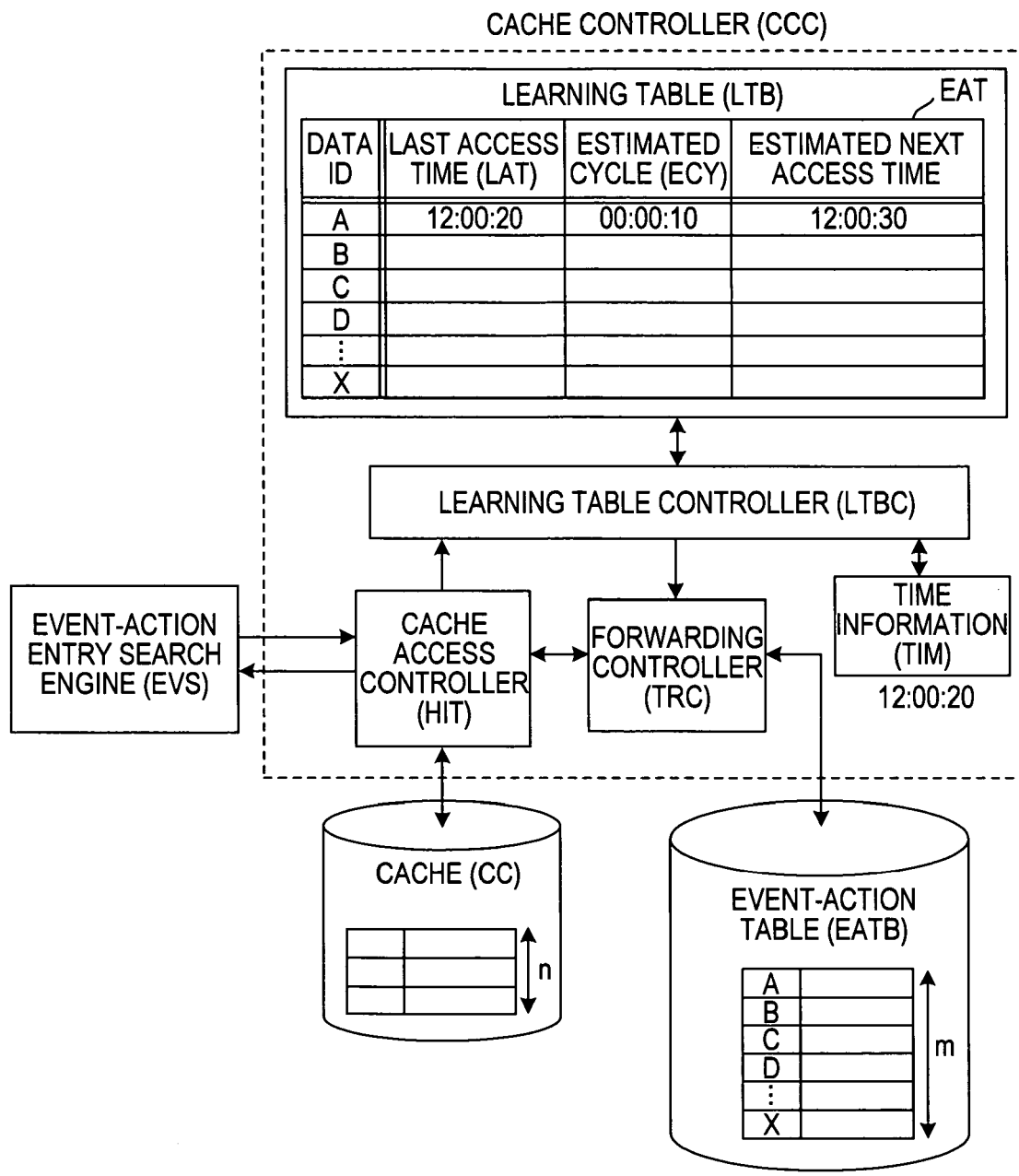
FIG. 15 also illustrates the updating of the learning table at the time of sensing data arrival.
Figure 21:
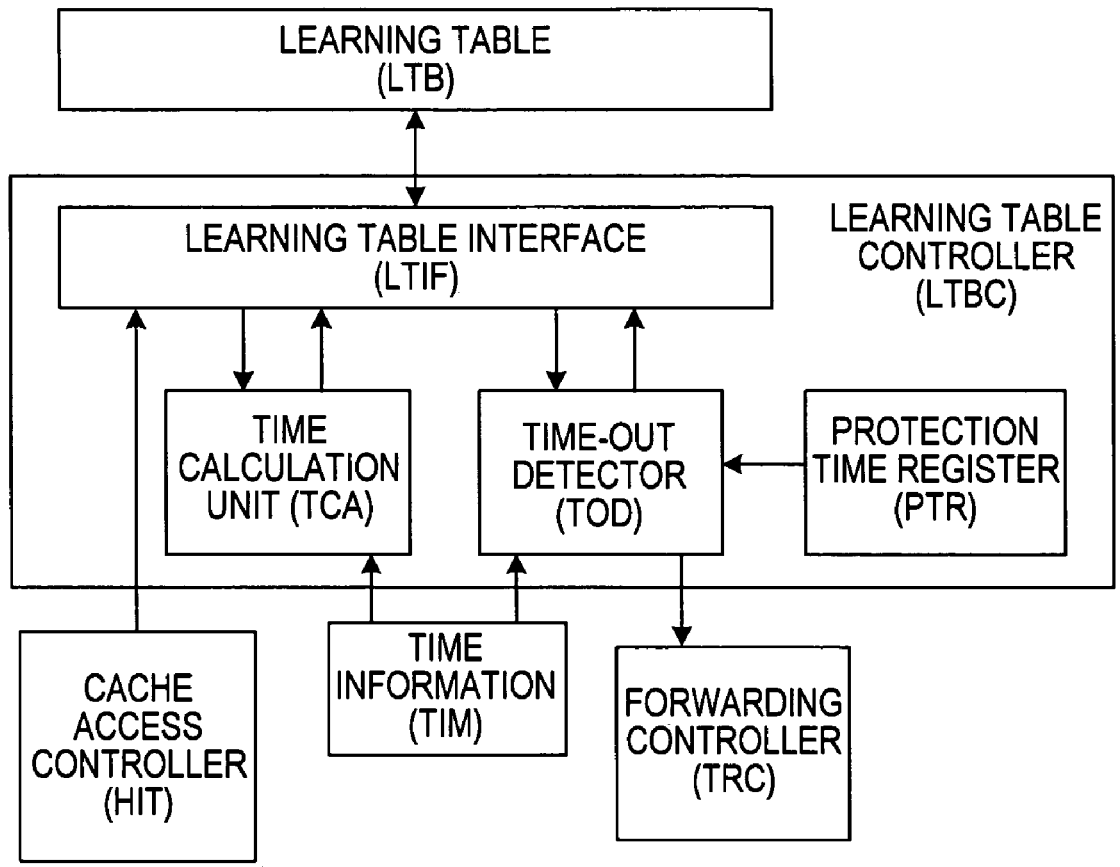
FIG. 21 is a functional block diagram of a learning table controller according to this invention.

Next, processing by the cache controller CCC to update information in the learning table LTB at the time of sensing data arrival will be described with reference to FIG. 13 through FIG. 15. The learning table LTB manages a last access time LAT, estimated cycle ECY, and estimated next access time EAT for each data ID. Accessing the learning table LTB and the control of data updating and searching therein are accomplished via the learning table controller LTBC. The learning table controller LTBC includes a learning table interface (LTIF), a time calculation unit (TCA), a time-out detector (TOD) and a protection time register (PTR) as shown in FIG. 21.

Upon receiving a data ID from the event-action entry search engine EVS, the cache controller CCC transmits the data ID to the cache access controller HIT (step 201). The cache access controller HIT transmits the received data ID to the learning table LTB via the learning table interface LTIF (step 202). It is checked whether or not the last access time LAT corresponding to the data ID in the learning table LTB (data ID=A in the example of FIG. 14) is registered (step 203) and, if the last access time LAT is not registered, the current time will be acquired from the time information TIM and processed for registration as the last access time LAT (step 207). Or if the last access time LAT is registered, the current time will be acquired from the time information TIM, and its difference from the last access time LAT will be calculated to figure out the estimated cycle ECY (step 204).

Next, the current time is written over the last access time LAT (step 205), and further the estimated next access time EAT, obtained by adding the estimated cycle ECY figured out at step 204 to the current time, is registered in the learning table LTB (step 206). The processing at these steps 204 through 207 is performed by the time calculation unit TCA. In the example of FIG. 14, time "12:00:10" is already registered as the last access time LAT corresponding to the data ID=A, indicating that the data corresponding to the data ID=A arrived at time "12:00:20". In this case, as shown in the example of FIG. 15, the estimated cycle ECY is calculated to be "00:00:10," from the difference between the data arrival time "12:00:20" and the last access time LAT "12:00:10". Further, the estimated next access time is figured out to be "12:00:30" by adding the estimated cycle ECY "00:00:10" to the data arrival time "12:00:20". Incidentally, FIG. 15 shows a state after the current time "12:00:20" is written over the last access time LAT.

Figure 16:
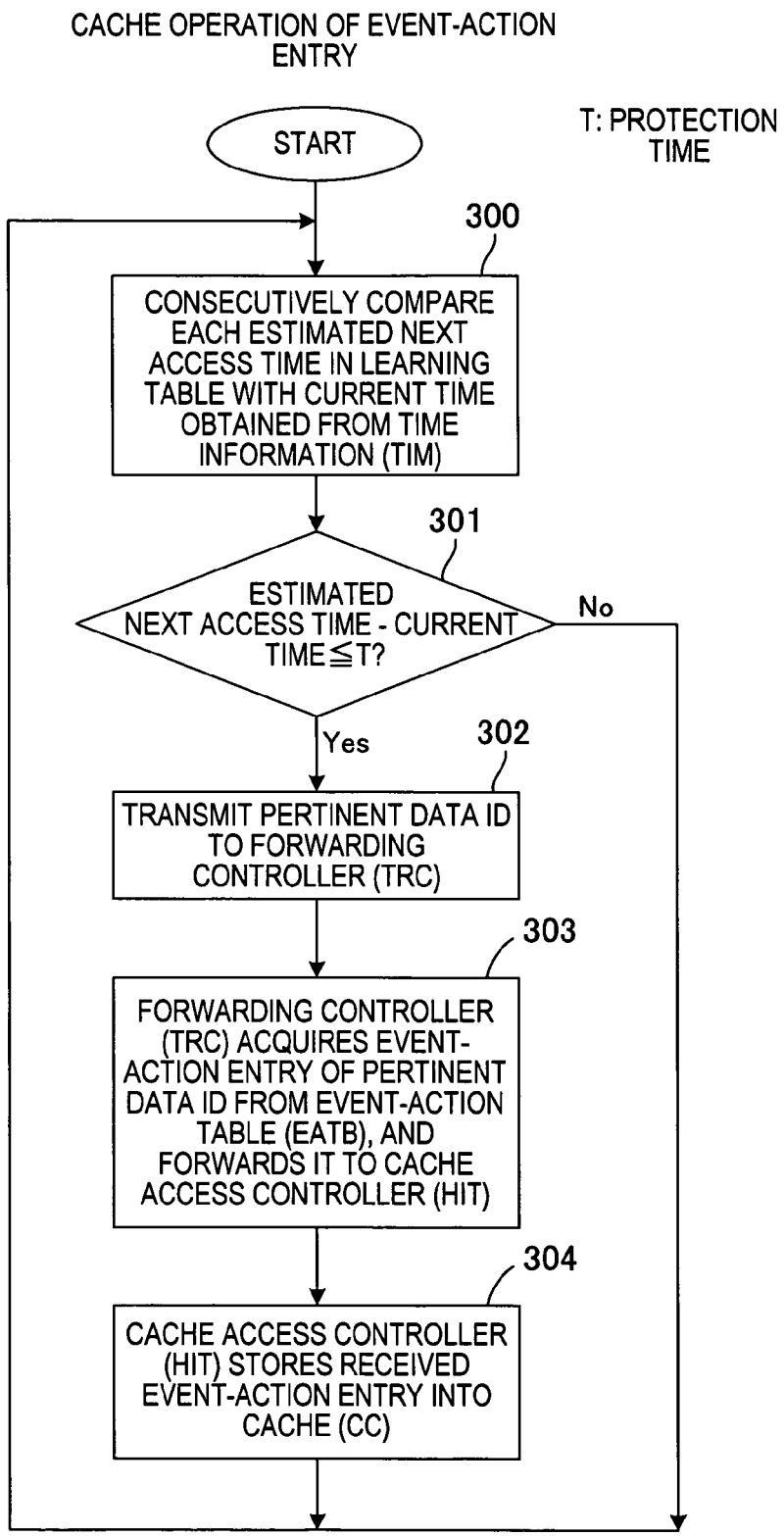
FIG. 16 is a sequence diagram of cache operation for event-action entry.
Figure 17:
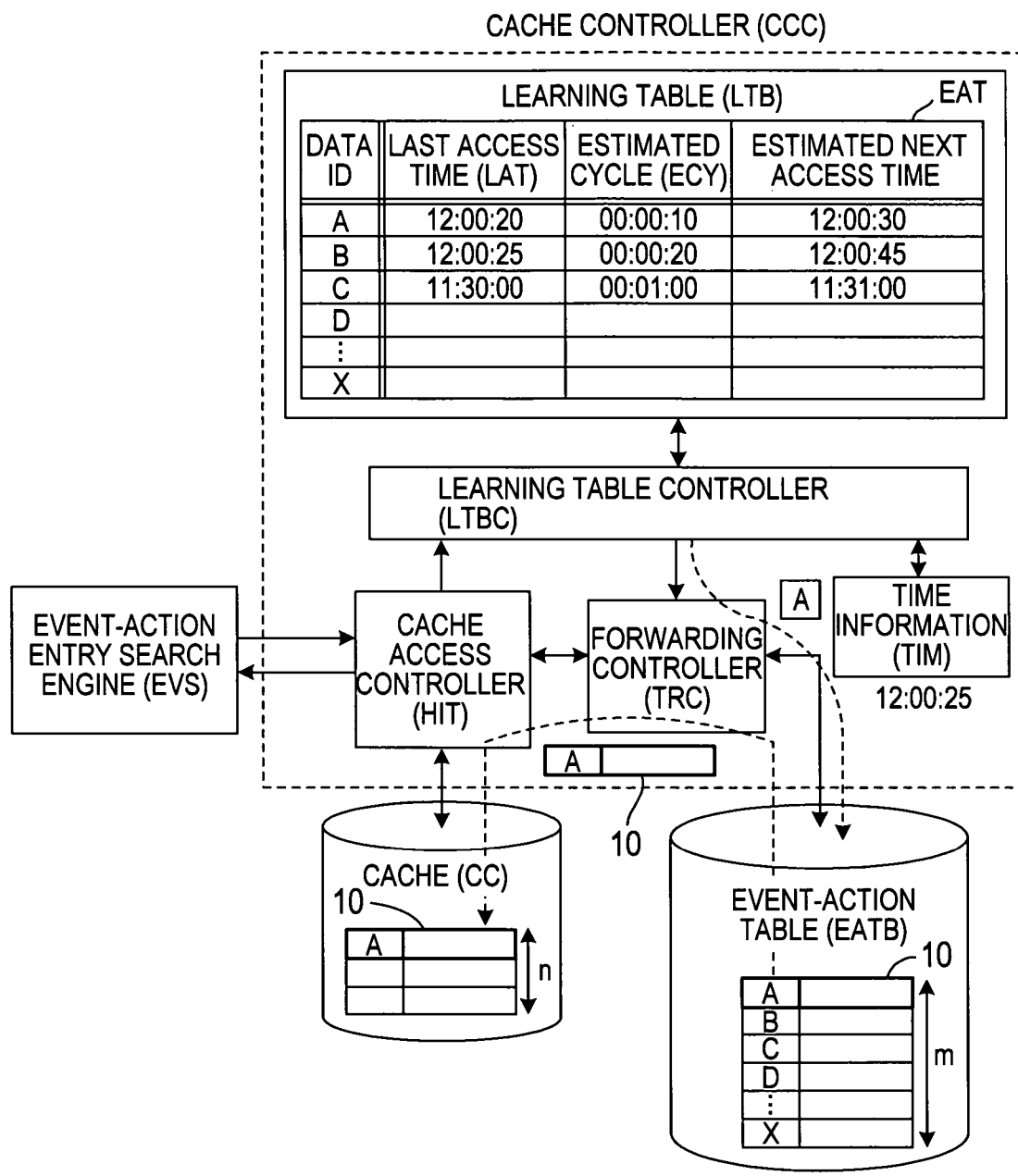
FIG. 17 illustrates the cache operation for event-action entry.

Finally, the operation by the cache controller CCC to forward an event-action entry from the event-action table EATB to the cache CC will be described with reference to FIG. 16 through FIG. 17 and FIG. 21.

In the learning table controller LTBC, every one of the estimated next access times EAT is consecutively compared with the current time obtained from the time information TIM (step 300). More specifically, the differences between the estimated next access time EAT and the current time is calculated by the time-out detector TOD (step 301). Any data ID for which the difference between the estimated next access time EAT and the current time is found greater than T as a result undergoes no processing. T here is the protection time necessary for the forwarding of an event-action entry from the event-action table EATB to the cache CC. The value of the protection time T is preset in the protection time register PTR. If the difference is found not greater than T, the time-out detector TOD will forward the pertinent data ID to the forwarding controller TRC (step 302).

The forwarding controller TRC having received the data ID retrieves the event-action entry pertinent to that data ID from the event-action table EATB and forwards it to the cache access controller HIT (step 303). After that, the cache access controller HIT stores the received event-action entry into the cache CC (step 304). In the example shown in FIG. 17, where the protection time T="00:00:05" holds the estimated next access time EAT "12:00:30" corresponding to the data ID=A satisfies the condition of step 301 at time "12:00:25". Then, information on the data ID=A is transmitted from the learning table LTB to the forwarding controller TRC. The forwarding controller TRC acquires from the event-action table EATB an event-action entry 10 corresponding to the data ID=A, and forwards it to the cache CC.

By consecutively applying the processing described above to every data ID, it is made possible to acquire, in response to cyclic arrivals of sensing data, corresponding event-action information from the cache at high speed and thereby to perform on a real time basis event-action processing at the time of sensing data arrival. Therefore, it is possible to realize a sensor network system that can quickly keep track of variations in information even where a vast quantity of sensing data has flowed into the system. Furthermore, since a function to learn the arriving cycles of sensing data is provided, the cache timing of event-action information can be autonomously adjusted even when the arriving cycles of sensing data have been altered.

Embodiment 2

Next, another embodiment of the cache controller CCC will be described below.

Figure 18:
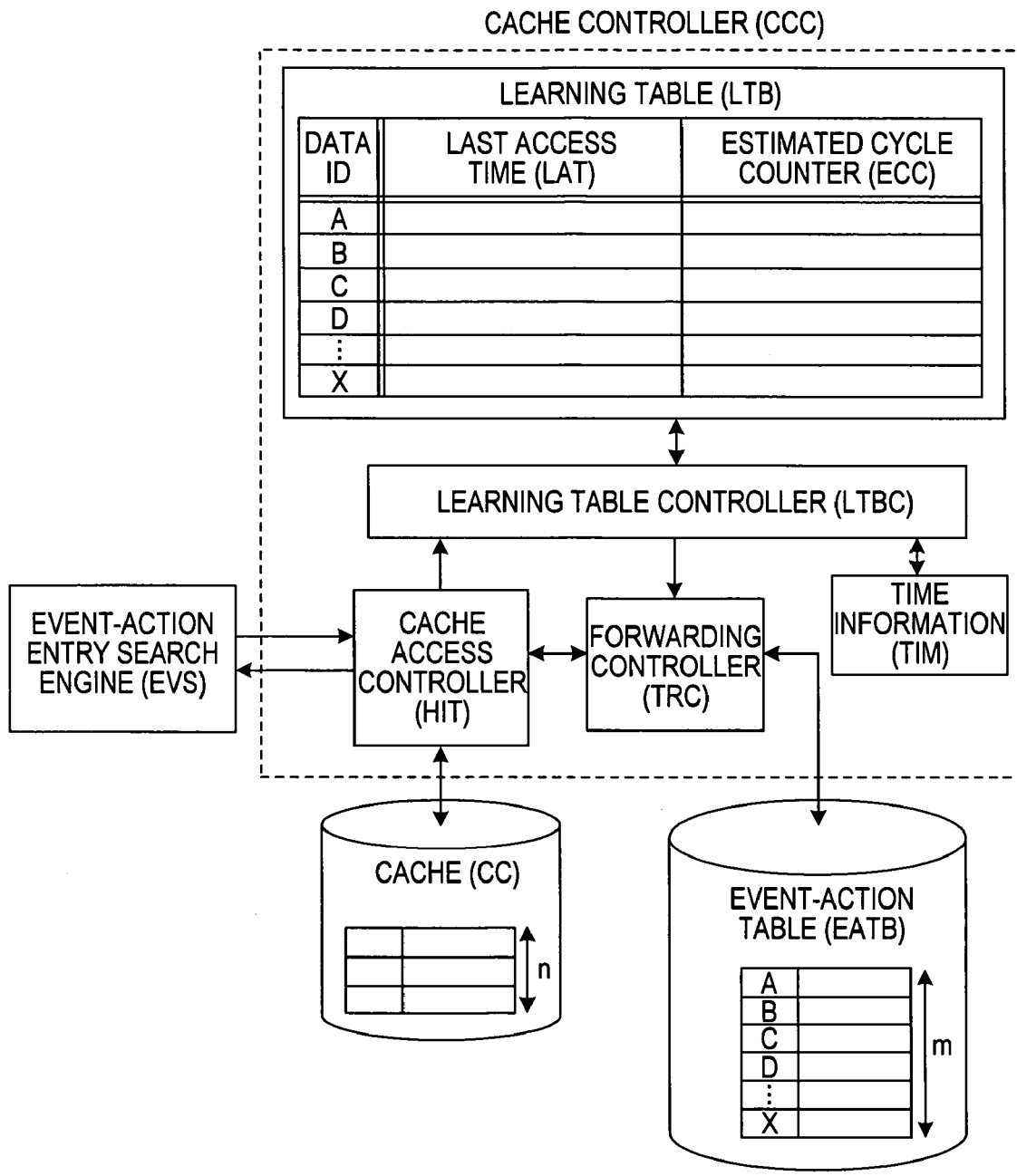
FIG. 18 is a functional block diagram of a cache control method, which is a second preferred embodiment of this invention.

Another configuration of the cache controller CCC is shown in FIG. 18. The cache controller CCC, like the one shown in FIG. 1, includes a cache access controller HIT, a learning table LTB, a learning table controller LTBC, a forwarding controller TRC and time information TIM, but the learning table LTB further includes a last access time LAT and an estimated cycle counter ECC for each data ID.

In this configuration, the processing to acquire an event-action entry from a data ID at the time of sensing data arrival is the same as what was described with reference to FIG. 12, and its description will not be duplicated.

Figure 19:
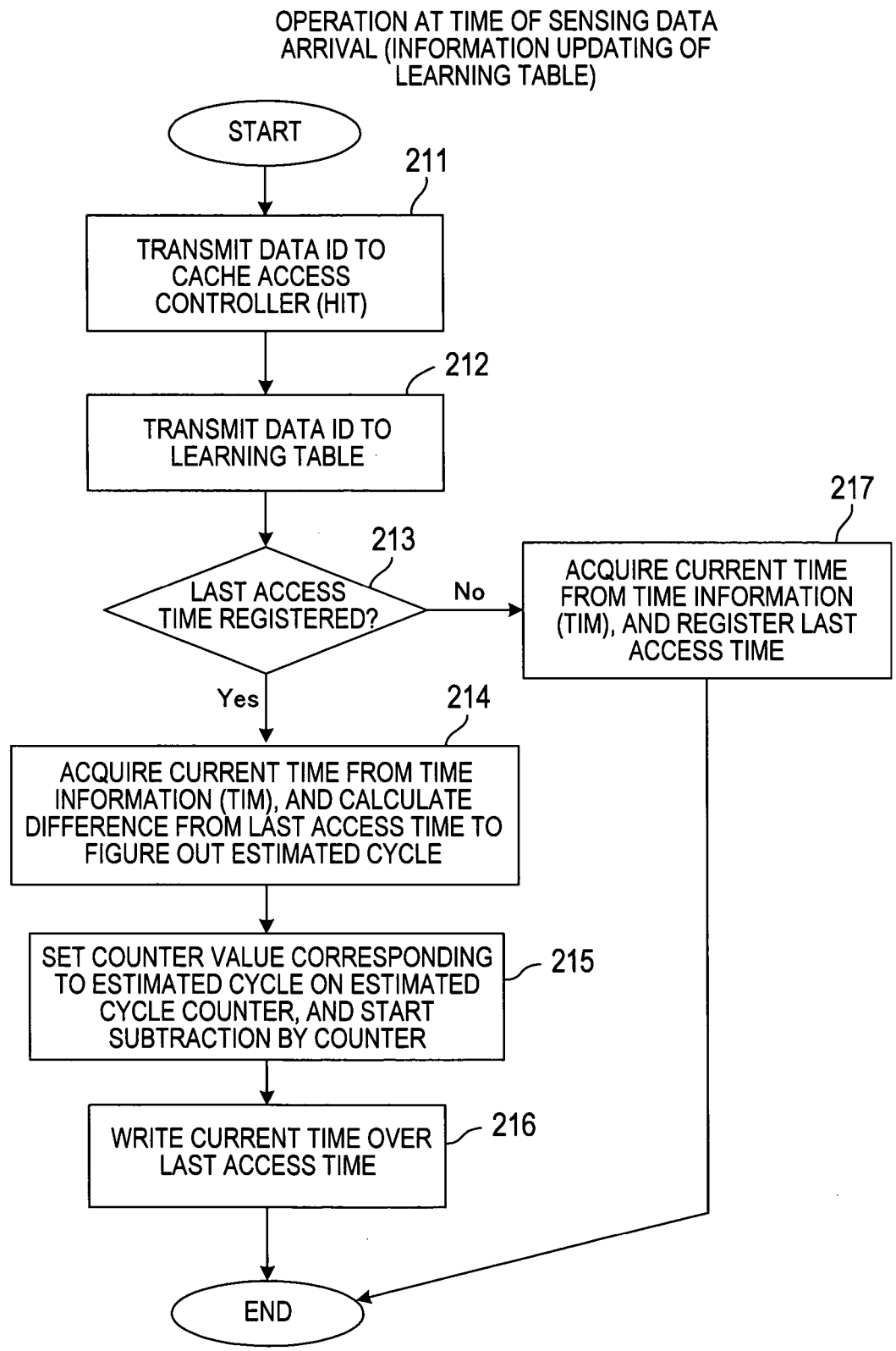
FIG. 19 is a sequence diagram concerning the information updating of the learning table at the time of sensing data arrival.

Processing by the cache controller CCC to update information in the learning table LTB at the time of sensing data arrival will be described with reference to FIG. 19.

Upon receiving a data ID form the event-action entry search engine EVS, the cache controller CCC transmits the data ID to the cache access controller HIT (step 211). The cache access controller HIT transmits the received data ID to the learning table LTB (step 212). It is checked whether or not a last access time LAT corresponding to the data ID in the learning table LTB is registered (step 213) and, if no such last access time LAT is registered, the current time will be acquired from the time information TIM and subjected to registration processing as the last access time LAT (step 217). Or if a pertinent last access time LAT is registered, the current time will be acquired from the time information TIM, and the difference from the last access time LAT is calculated to figure out the estimated cycle (step 214). Next, a counter value corresponding to the estimated cycle is set on the estimated cycle counter ECC, whose counting down is then started (step 215). After that, the current time is written over the last access time LAT (step 216).

Figure 20:
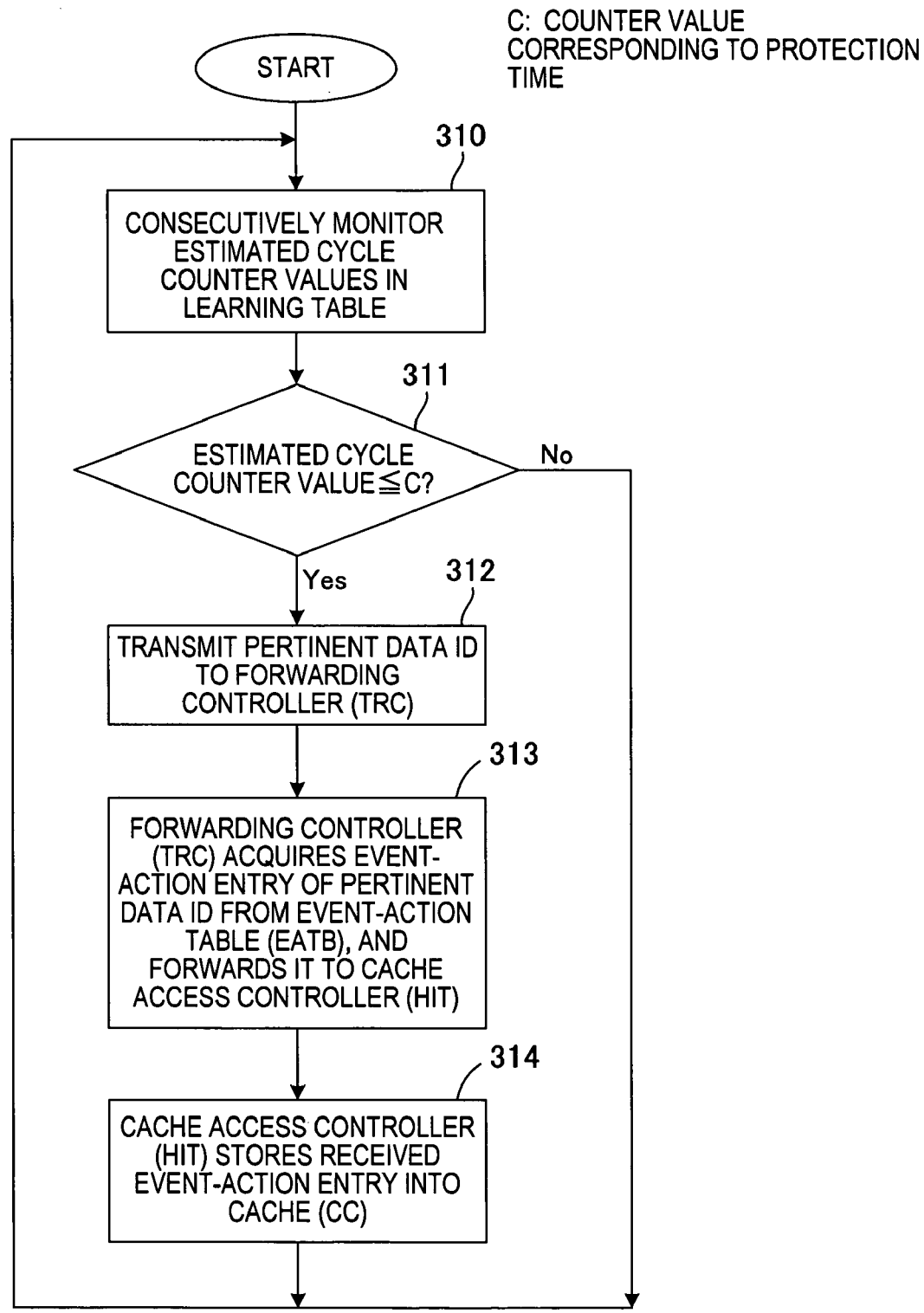
FIG. 20 is a sequence diagram of the cache operation for event-action entry.

Next will be described the operation of the cache controller CCC to cache an event-action entry with reference to FIG. 20. In the learning table controller LTBC, every one of the registered values of the estimated cycle counter ECC is consecutively monitored (step 310), and the value of the counter value ECC and the protection counter value C are compared (step 311). The protection counter value C here is a counter value equivalent to the length of time required for forwarding an event-action entry from the event-action table EATB to the cache CC. Any data ID for which the value of the estimated cycle counter ECC is found greater than the protection counter value C as a result undergoes no processing. Or if the difference is found not greater than C, the pertinent data ID will be transmitted to the forwarding controller TRC (step 312). Next, the forwarding controller TRC acquires the event-action entry of the pertinent data ID from the event-action table EATB and forwards it to the cache access controller HIT (step 313). After that, the cache access controller HIT stores the received event-action entry into the cache CC (step 314). Thus, this embodiment has an advantage that, since it is sufficient merely to compare the value of the estimated cycle counter ECC with the protection counter value C, there is no need to manage the timing of forwarding to the cache as time information.

Embodiment 3

Figure 22:
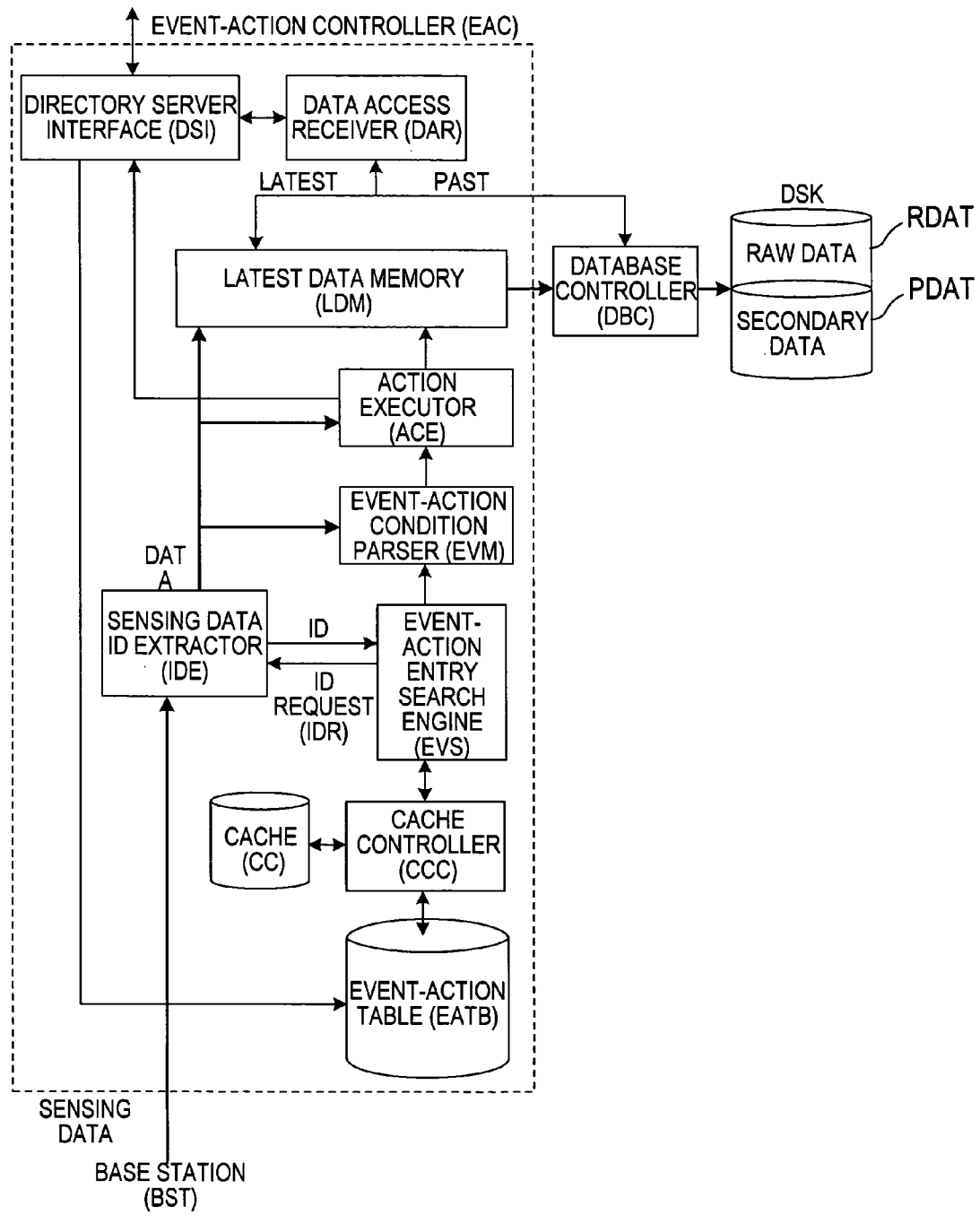
FIG. 22 is a functional block diagram of another configuration of an event-action controller according to this invention.
Figure 23:
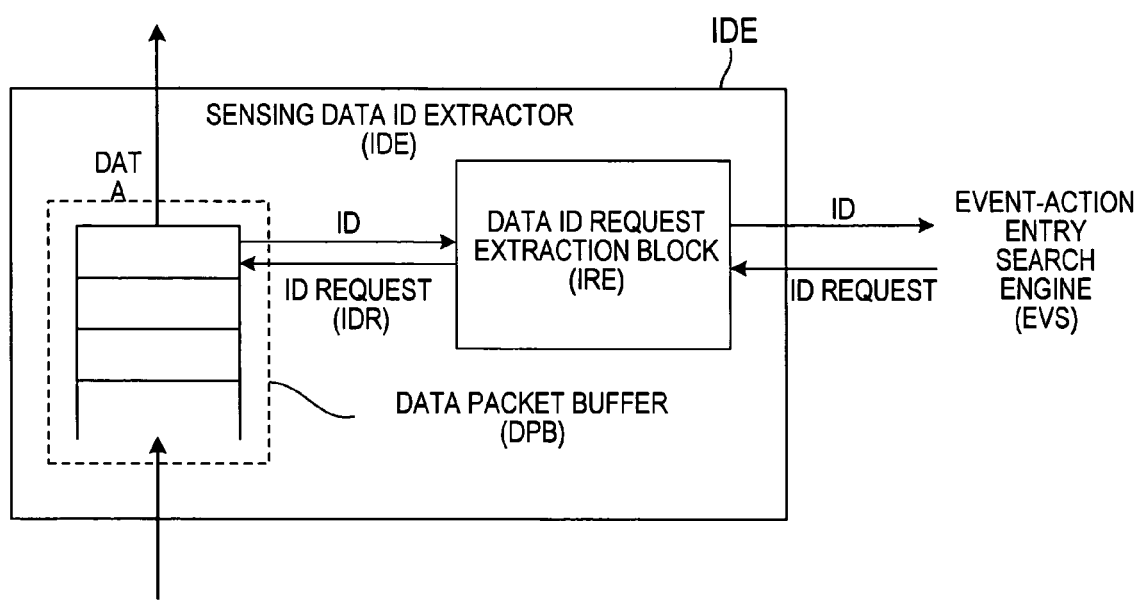
FIG. 23 is a functional block diagram of a sensing data ID extractor according to this invention.

Next will be described another embodiment of the event-action controller EAC with reference to FIG. 22. While the configuration of the event-action controller EAC shown in FIG. 11 is such that the sensing data ID extractor IDE extracts a data ID every time of arrival of entered sensing data and sends it to the event-action entry search engine EVS, the configuration shown in FIG. 22 is such that the sensing data ID extractor IDE has a data packet buffer DPB as shown in FIG. 23, and the arriving sensing data is accumulated in this buffer.

The sensing data ID extractor forwards data ID information to the event-action entry search engine EVS in response to a request from the event-action entry search engine EVS. More specifically, according to the completion of on-going event-action search or the load of processing, the event-action entry search engine EVS acquires through the data ID request extraction block IRE of the sensing data ID extractor IDE the next data ID from the leading data of the data packet buffer and processes the next event-action search.

This configuration has an advantage that, since sensing data that arrive is accumulated in the data packet buffer DPB, event-action search processing will not overflow the capacity even if data packets arrive in a burst.

Figure 24:
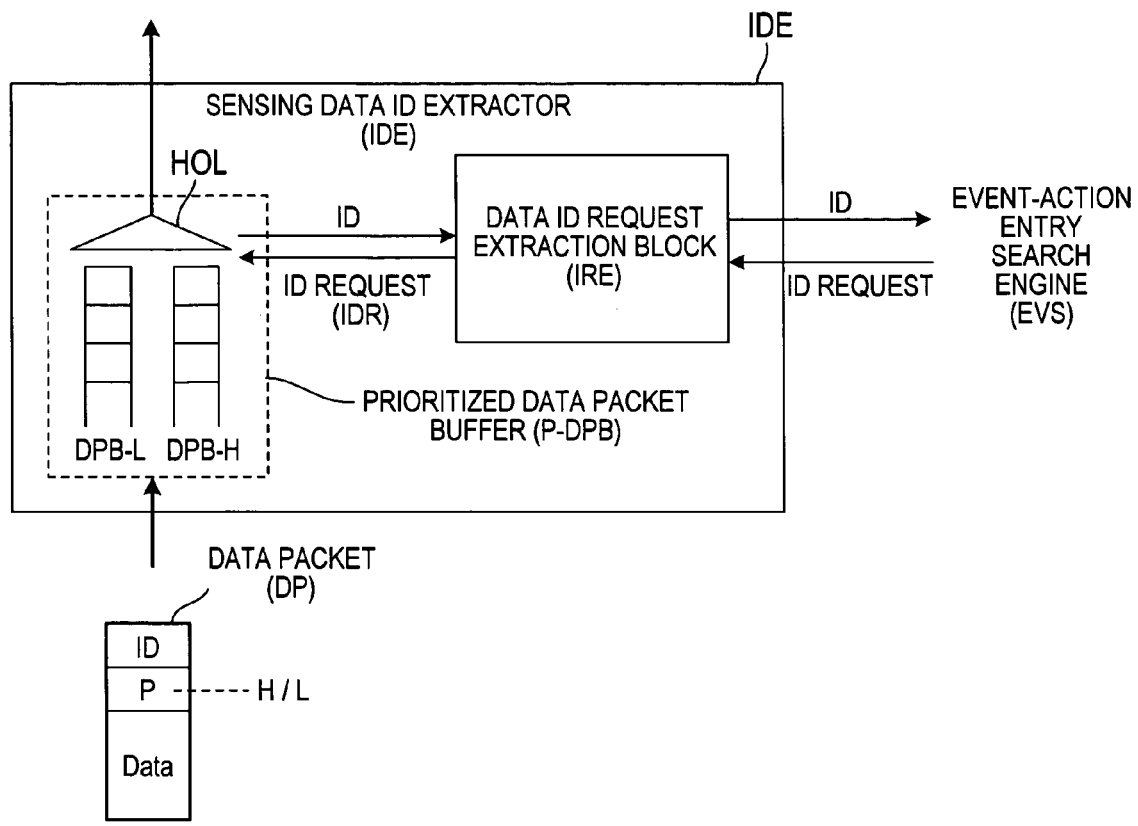
FIG. 24 is a functional block diagram of another configuration of the sensing data ID extractor according to this invention.

Furthermore, as shown in FIG. 24, the sensing data ID extractor IDE can use a data packet buffer P-DPB with a prioritized control function for sensing data.

More specifically, a bit (P) indicating priority processing H/non-priority processing L is added in advance to a sensing data packet DP to be entered, so that the prioritization is made between the two alternatives in the processing of buffering. Event-action searching for a priority data packet can be carried out with priority irrespective of the sequence of arrivals by storing priority data packets of higher priority into the priority queue buffer DPB-H of the prioritized data packet buffer P-DPB and priority data packets of lower priority into the non-priority queue buffer DPB-L of the same and performing prioritized read control with a head of line controller HOL. In more specific terms, when an ID request IDR is received, the head of line controller HOL of the prioritized data packet buffer P-DPB gives priority to the priority queue in ID sending/data transmission processing if the priority queue buffer DPB-H has any data packets. The data packets stored in the non-priority queue buffer DPB-L are to be processed only if there is no data packet in the priority queue buffer DPB-H.

Thus prioritizing the event-action search processing of sensing data enables more important data packets or data packets which require prompt processing to be subjected to event-action processing with priority with less delay even where sensing data arrives at the event-action controller in a burst and imposes a heavy load on event-action search processing.

By anticipating the arrival timing of sensing data and forwarding only required entries out of a vast number of entries accumulated in the event-action table to a cache in advance, it is made possible to achieve faster event-action processing to be applied to each set of sensing data. Therefore, a sensor network system can be realized which, even if a vast quantity of sensing data flows into the system, does not let that vast volume constitute a bottleneck in processing but can promptly carry out necessary processing, such as detecting variations in information and causing the data holder to function.

While the present invention has been described in detail and pictorially in the accompanying drawings, the present invention is not limited to such detail but covers various obvious modifications and equivalent arrangements, which fall within the purview of the appended claims.

What is claimed is:

1. A server which receives data transmitted from a plurality of sensor nodes each having actions occurring intermittently, the server having an event-action controller that executes preset processing corresponding to each of the sensor nodes when the data transmitted by the corresponding sensor node satisfies a preset condition corresponding to the corresponding sensor node, wherein:

the event-action controller has:

an event-action table for storing event-action entries, each of the event-action entries respectively comprising a data ID assigned to the data transmitted by a corresponding sensor node of the plurality of sensor nodes, preset processing corresponding to the data ID, and a preset condition corresponding to the data ID, a cache for storing a subset of the event-action entries stored in the event-action table, a learning table for storing each data ID assigned to the data transmitted by the plurality of sensor nodes, a respective time for each data ID indicating when the server received a most recent data to which the data ID is assigned, and a respective estimated time of receiving a next data for each data ID subsequent to receiving the most recent data for the data ID calculated based on the respective time when the server received the most recent data to which the data ID is assigned, a forwarding controller for receiving each data ID stored in the learning table for which a balance of subtraction of a current time from the respective estimated time of receiving the next data for the data ID is shorter than a prescribed length of time from the learning table and forwarding the event-action entries of the event-action table that respectively comprise each data ID received from the learning table from the event-action table to the cache, and a cache access controller for determining whether or not the event-action entry respectively comprising the data ID for each data transmitted from any of the sensor nodes is stored in the cache.

2. The server according to claim 1, wherein:

the event-action controller further has an event-action entry search engine for receiving the data ID for the data transmitted from any of the sensor nodes, and forwards the event-action entry corresponding to the data ID from the cache to the event-action entry search engine when the event-action entry corresponding to the data ID of the data transmitted from any of the sensor nodes is stored in the cache.

3. The server according to claim 1, wherein:

the event-action controller further has:

an event-action entry search engine for receiving the data ID for the data transmitted from any of the sensor nodes, and wherein:

the cache access controller, when the data ID for the data transmitted from any of the sensor nodes is not stored in the cache, forwards to the forwarding controller the data ID for the data transmitted from any of the sensor nodes, and the forwarding controller acquires from the event-action table the event-action entry corresponding to the data ID for the data transmitted from any of the sensor nodes and forwards it to the event-action entry search engine via the cache access controller.

4. A method of processing data transmitted from a plurality of sensor nodes each having actions occurring intermittently with a server, comprising:

a step of storing event-action entries in an event action table, each of the event-action entries respectively comprising a preset condition corresponding to a data ID assigned to the data transmitted by a corresponding sensor node of the plurality of sensor nodes and corresponding processing to be executed for each of the data transmitted by the corresponding sensor node that satisfies the preset condition corresponding to the data ID assigned to the data transmitted by the corresponding sensor node, a step of storing into a learning table each data ID assigned to the data transmitted by the plurality of sensor nodes, a respective time for each data ID indicating when the server received a most recent data to which the data ID is assigned, and a respective estimated time of receiving a next data for each data ID subsequent to receiving the most recent data for the data ID calculated based on the respective time when the server received the most recent data to which the data ID is assigned, a step of receiving each data ID stored in the learning table for which a balance of subtraction of a current time from the respective estimated time of receiving the next data for the data ID is shorter than a prescribed length of time, a step of forwarding the event-action entries of the event-action table that respectively comprise each data ID received from the learning table from the event-action table to a cache that stores a subset of the event-action entries stored in the event-action table, and a step of determining whether or not the event-action entry respectively comprising the data ID for each data transmitted from any of the sensor nodes is stored in the cache.

5. A machine-readable medium storing a program by which data transmitted from a plurality of sensor nodes each having actions occurring intermittently are received, by which preset processing corresponding to each of the sensor nodes is executed when the data transmitted the corresponding sensor node satisfies a preset condition corresponding to the corresponding sensor node, and which causes a server to execute: the program comprising the steps of:

processing to store event-action entries into an event-action table, each of the event-action entries respectively having a data ID assigned to the data transmitted by a corresponding sensor node of the plurality of sensor nodes, preset processing corresponding to the data ID, and a preset condition corresponding to the data ID, processing to store into a learning table each data ID assigned to the data transmitted by the plurality of sensor nodes, a respective time for each data ID indicating when the server received a most recent data to which the data ID is assigned, and a respective estimated time of receiving a next data for each data ID subsequent to receiving the most recent data for the data ID calculated based on the respective time when the server received the most recent data to which the data ID is assigned, processing to receive each data ID stored in the learning table for which a balance of subtraction of a current time from the estimated time of receiving the next data for the data ID is shorter than a prescribed length of time from the learning table and forward the event-action entries of the event-action table that respectively has each data ID received from the learning table from the event-action table to a cache that stores a subset of the event-action entries stored in the event-action table, and processing to determine whether or not the event-action entry respectively having the data ID for each data transmitted from any of the sensor nodes is stored in the cache.

* * * * *